United States Patent
Chou

(10) Patent No.: US 8,717,688 B2
(45) Date of Patent: May 6, 2014

(54) IMAGE CAPTURING LENS SYSTEM

(71) Applicant: Largan Precision Co., Ltd., Taichung (TW)

(72) Inventor: Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 2 days.

(21) Appl. No.: 13/732,937

(22) Filed: Jan. 2, 2013

(65) Prior Publication Data

US 2014/0098430 A1    Apr. 10, 2014

(30) Foreign Application Priority Data

Oct. 9, 2012    (TW) .............................. 101137244 A

(51) Int. Cl.
| | | |
|---|---|---|
| G02B 9/60 | (2006.01) | |
| G02B 13/00 | (2006.01) | |
| G02B 13/02 | (2006.01) | |
| G02B 9/00 | (2006.01) | |
| G02B 9/62 | (2006.01) | |
| G02B 9/64 | (2006.01) | |

(52) U.S. Cl.
CPC ................ *G02B 13/00* (2013.01); *G02B 13/02* (2013.01); *G02B 13/0045* (2013.01); *G02B 9/00* (2013.01); *G02B 9/60* (2013.01); *G02B 9/62* (2013.01); *G02B 9/64* (2013.01); *G02B 13/001* (2013.01)

USPC ............ 359/764; 359/714; 359/715; 359/753

(58) Field of Classification Search
CPC .............. G02B 9/00; G02B 9/60; G02B 9/62; G02B 9/64; G02B 13/00; G02B 13/02; G02B 13/001; G02B 13/18; G02B 13/0045
USPC .................................. 359/713, 714, 746, 764
See application file for complete search history.

(56) References Cited

U.S. PATENT DOCUMENTS

| | | | |
|---|---|---|---|
| 8,000,030 B2 | 8/2011 | Tang | |
| 8,179,470 B2 | 5/2012 | Chen et al. | |
| 2013/0100542 A1* | 4/2013 | Tsai et al. | 359/714 |
| 2013/0182336 A1* | 7/2013 | Hsu et al. | 359/714 |
| 2013/0229718 A1* | 9/2013 | Tsai et al. | 359/714 |

* cited by examiner

*Primary Examiner* — Ricky Mack
*Assistant Examiner* — William Alexander
(74) *Attorney, Agent, or Firm* — Morris Manning & Martin, LLP; Tim Tingkang Xia, Esq.

(57) ABSTRACT

This disclosure provides an image capturing lens system comprising: a positive first lens element having a convex object-side surface; a negative second lens element having a concave object-side surface; a positive third lens element having a convex object-side surface; a negative fourth lens element having a concave object-side surface and a convex image-side surface; a fifth lens element with refractive power having a concave image-side surface, the shape of the image-side surface changing from concave at the paraxial region thereof to convex while away from the paraxial region thereof, both of the object-side and image-side surfaces being aspheric.

21 Claims, 22 Drawing Sheets

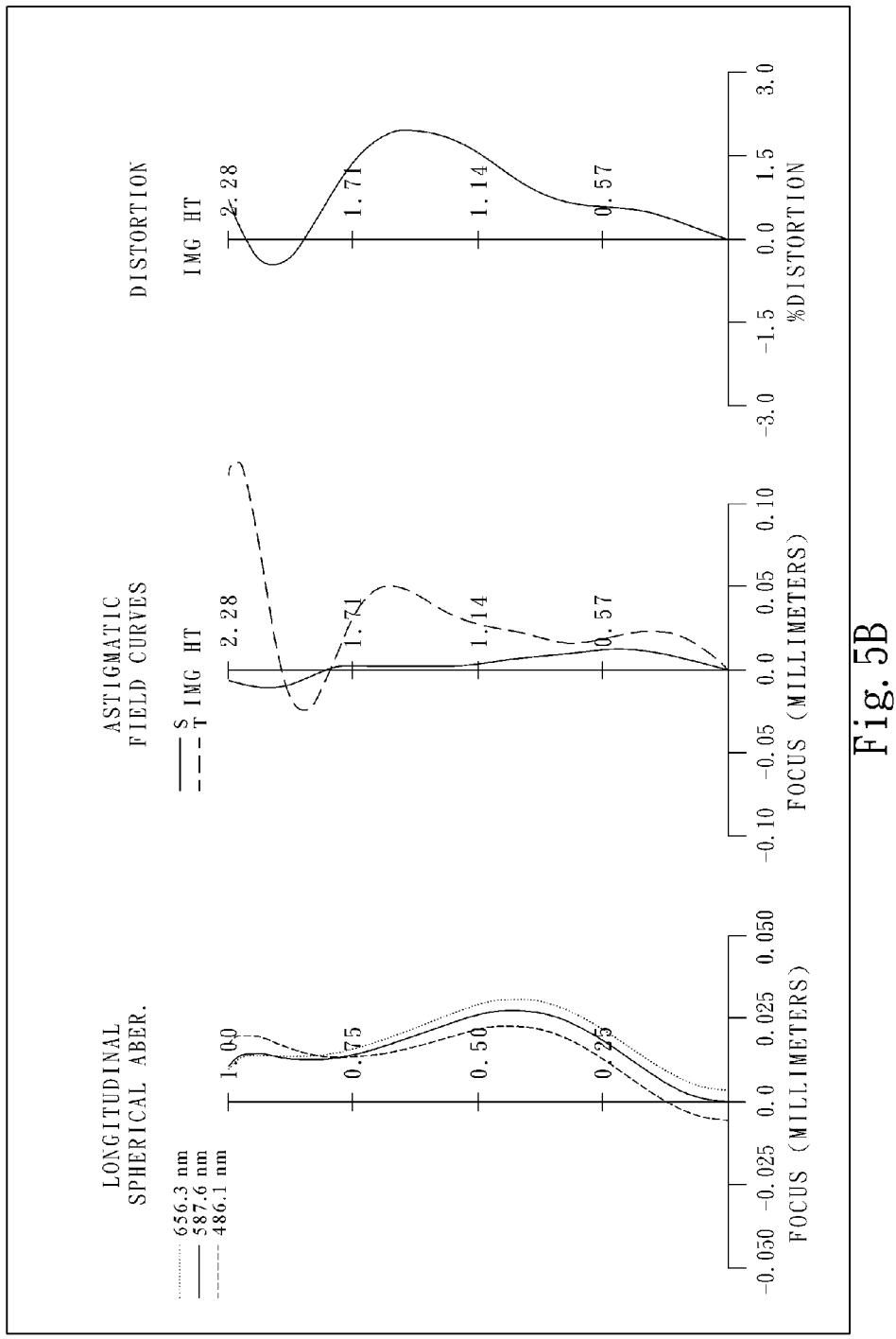

IMAGE CAPTURING LENS SYSTEM

CROSS-REFERENCE TO RELATED APPLICATION

This non-provisional application claims priority under 35 U.S.C. §119(a) on Patent Application No. 101137244 filed in Taiwan (R.O.C.) on Oct. 9, 2012, the entire contents of which are hereby incorporated by reference.

BACKGROUND

1. Field of the Disclosure

The present disclosure relates to an image capturing lens system, and more particularly, to a compact image capturing lens system used in electronic products.

2. Description of the Related Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor) sensor. Furthermore, as the advanced semiconductor manufacturing technology has allowed the pixel size of sensors to be reduced, and the current electronic products are leaning toward a trend of being more compact, there is an increasing demand for higher image quality.

A conventional compact imaging lens system with high image quality equipped on a portable electronic product is often composed of four lens elements such as the lens system set forth in U.S. Pat. No. 8,179,470. However, with the popularity of high level portable electronic products, such as smart phone and PDA (Personal Digital Assistant), the demand for the pixel size and image quality of compact imaging lens system increase fast, and the conventional lens system with four lens elements can no longer satisfy the imaging lens systems of even higher level.

Recently, lens systems adopting five lens elements begin to emerge, such as the lens system set forth in U.S. Pat. No. 8,000,030. However, the object side surfaces of both of the second lens element and the third lens element fail to obtain enough curvature; therefore, the capability of astigmatism correction is limited and the resolution thereof is affected. Furthermore, since the lens system struggles in handling the off-axis incident-light, it tends to have a vignetting effect in the formed image and the relative illumination of the lens system is so low that the image quality becomes undesirable.

In light of the foregoing, an image capturing lens system that is suitable for portable electronic devices and has excellent image quality is in need; especially for those whose second lens element and third lens element have particularly balanced curvature, which is favorable for astigmatism correction for improving resolution and moderating the angle of incidence from the off-axis field for increasing relative illumination.

SUMMARY

The present disclosure provides an image capturing lens system comprising, in order from an object side to an image side: a first lens element with positive refractive power having a convex object-side surface at a paraxial region; a second lens element with negative refractive power having a concave object-side surface at a paraxial region; a third lens element with positive refractive power having a convex object-side surface at a paraxial region; a fourth lens element with negative refractive power having a concave object-side surface at a paraxial region and a convex image-side surface at a paraxial region; and a fifth lens element with refractive power having a concave image-side surface at a paraxial region, the shape of the image-side surface changing from concave at the paraxial region thereof to convex while away from the paraxial region thereof, both of the object-side and image-side surfaces being aspheric; wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, and they satisfy the following relations:

$$-3.5<(R3+R4)/(R3-R4)<-0.2; \text{ and}$$

$$-3.5<(R5+R6)/(R5-R6)<-0.3.$$

On the other hand, the present disclosure provides an image capturing lens system comprising, in order from an object side to an image side: a first lens element with positive refractive power having a convex object-side surface at a paraxial region; a second lens element with negative refractive power having a concave object-side surface at a paraxial region; a third lens element with positive refractive power having a convex object-side surface at a paraxial region; a fourth lens element with refractive power having a concave object-side surface at a paraxial region and a convex image-side surface at a paraxial region; and a fifth lens element with refractive power having a concave image-side surface at a paraxial region, the shape of the image-side surface changing from concave at the paraxial region thereof to convex while away from the paraxial region thereof, both of the object-side and image-side surfaces being aspheric; wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, a focal length of the image capturing lens system is f, a focal length of the fourth lens element is f4, a focal length of the fifth lens element is f5, and they satisfy the following relations:

$$-3.5<(R3+R4)/(R3-R4)<-0.2;$$

$$-3.5<(R5+R6)/(R5-R6)<-0.3;$$

$$0<|f/f4|<0.8; \text{ and}$$

$$-1.0 \leq f/f5<0.50.$$

Furthermore, the present disclosure provides an image capturing lens system comprising, in order from an object side to an image side: a first lens element with positive refractive power having a convex object-side surface at a paraxial region; a second lens element with negative refractive power having a concave object-side surface at a paraxial region; a third lens element with positive refractive power having a convex object-side surface at a paraxial region; a fourth lens element with negative refractive power having a concave object-side surface at a paraxial region and a convex image-side surface at a paraxial region; and a fifth lens element with refractive power having a convex object-side surface at a paraxial region and a concave image-side surface at a paraxial region, the shape of the image-side surface changing from concave at the paraxial region thereof to convex while away from the paraxial region thereof, both of the object-side and image-side surfaces being aspheric; wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, and they satisfy the following relations:

$-3.5<(R3+R4)/(R3-R4)<0.6$; and $-3.5<(R5+R6)/(R5-R6)<-0.6$.

The aforesaid arrangement can increase the relative illumination of the present image capturing lens system and significantly improving resolution and image quality thereof while reducing astigmatism as well as the off-axis incident angle of the image capturing lens system.

The above as well as additional features and advantages of the present disclosure will become apparent in the following detailed written description.

BRIEF DESCRIPTION OF THE DRAWINGS

FIG. 5B shows the aberration curves of the fifth embodiment of the present disclosure.

DETAILED DESCRIPTION OF THE PREFERRED EMBODIMENTS

Figure 1A:
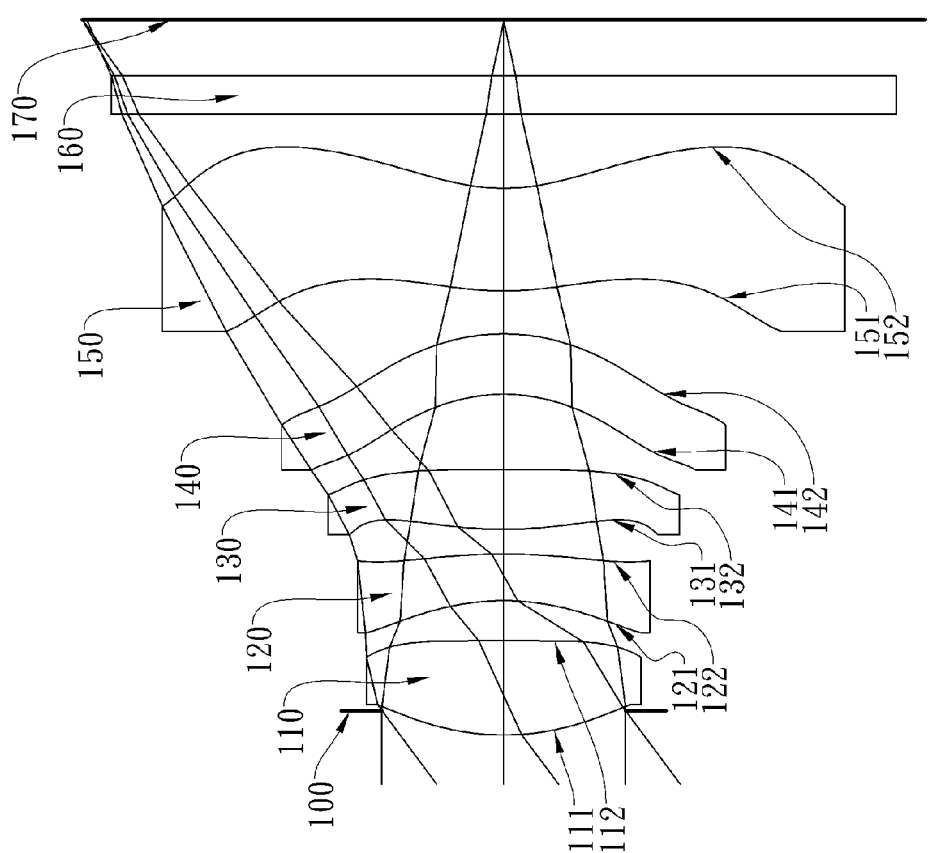
FIG. 1A shows an image capturing lens system in accordance with the first embodiment of the present disclosure.

The present disclosure provides an image capturing lens system, which comprise, in order from the object-side to the image-side, a first lens element, a second lens element, a third lens element, a fourth lens element and a fifth lens element.

The first lens element has positive refractive power, which provides the main refractive power of the system, and thereby the total track length of the system is reduced. When the first lens element has a convex object-side surface, the distribution of the positive refractive power thereof can be strengthened for reducing the total optical track length of the system.

The second lens element has negative refractive power, which is favorable for correcting the aberration produced by the first lens element. When the second lens element has a concave object-side surface, the negative refractive power can be controlled for increasing the aberration correction ability. In addition, when the second lens element has a convex image-side surface at a paraxial region, and the shape of the image-side surface changes toward the image-side at an outermost region of the image capturing lens system, the angle of incidence onto the image sensor from the off-axis field can be effectively reduced so that the sensing efficiency of the image sensor can be improved and the off-axis aberration can be corrected.

The third lens element has positive refractive power, which can reduce the sensitivity of the system. When the third lens element has a convex object-side surface which further enhances the positive refractive power of the third lens element, the sensitivity of the system can be reduced so that the manufacture yield rate can be improved.

The fourth lens element has a negative refractive power, which can consequently form a positive-negative telephoto structure with the positive third lens element so that the total track length can be effectively reduced. When the fourth lens is a concave-convex meniscus lens element, the astigmatism can be effectively corrected.

When the fifth lens element is a convex-concave meniscus lens element, the astigmatism can be effectively corrected. Moreover, when the shape of the image-side surface of the fifth lens element changes from concave at the paraxial region to convex while away from the paraxial region, the angle of incidence onto the image sensor from the off-axis field can be effectively reduced so that the sensing efficiency of the image sensor can be improved and the off-axis aberration can be corrected.

A curvature radius of the object-side surface of the second lens element is R3. A curvature radius of the image-side surface of the second lens element is R4. When the relation of $-3.5<(R3+R4)/(R3-R4)<0.6$ is satisfied, the curvature of the second lens element is favorable for moderating the angle of incidence onto the image sensor from the off-axis field so that the relative illumination of the system can be increased; moreover, the collective allocation of the second lens element and the third lens element are able to correct astigmatism in accord for improving resolution of the lens system. Preferably, the following relation is satisfied: $-3.5<(R3+R4)/(R3-R4)<-0.2$. More preferably, the following relation is satisfied: $-3.5<(R3+R4)/(R3-R4)<-0.5$. Even more preferably, the following relation is satisfied:

$-3.5<(R3+R4)/(R3-R4)<-1.0$.

A curvature radius of the object-side surface of the third lens element is R5. A curvature radius of the image-side surface of the third lens element is R6. When the relation of $-3.5<(R5+R6)/(R5-R6)<-0.3$ is satisfied, the curvature of the third lens element is favorable for moderating the angle of incidence onto the image sensor from the off-axis field so that the relative illumination of the system can be increased. Besides, the second lens element and the third lens element are able to correct astigmatism cooperatively for improving resolution of the lens system. Preferably, the following relation is satisfied: $-3.5 < (R5+R6)/(R5-R6) \leftarrow 0.6$.

A curvature radius of the object-side surface of the fourth lens element is R7. A curvature radius of the image-side surface of the fourth lens element is R8. When the relation of $|(R7-R8)/(R7+R8)| < 0.3$ is satisfied, the astigmatism can be effectively corrected.

An Abbe number of the second lens element is V2. An Abbe number of the first lens element is V1. When the relation of $0.30 < V2/V1 < 0.60$ is satisfied, the chromatic aberration of the system can be effectively corrected.

A central thickness of the third lens element is CT3. A vertical distance with respect to an optical axis between a non-axial critical point on the object-side surface of the third lens element and the optical axis is Yc31. When the relation of $0.2 < CT3/Yc31 < 1.0$ is satisfied, it is favorable for the manufacture and assembly of the lens elements and is favorable for reducing the angle of incidence onto the image sensor from the off-axis field so that the off-axis aberration can be corrected.

A focal length of the image capturing lens system is f. A focal length of the fourth lens element is f4. A focal length of the fifth lens element is f5. A focal length of the third lens element is f3. When the relation of $0 < (|f/f4|+|f/f5|)/(f/f3) < 1.0$ is satisfied, it is favorable for reducing the sensitivity of the system and correcting aberration.

When the relation of $0 < |f/f4| < 0.8$ is satisfied, a balance between shortening the back focal length and reducing sensitivity can be obtained for compacting the lens system and having high manufacture yield rate.

When the relation of $-1.0 \leq f/f5 < 0.50$ is satisfied, the distribution of refractive power and aberration correction can be balanced so that the resolution and image quality can be improved.

In the aforementioned image capturing lens system, the lens elements can be made of glass or plastic materials. If the lens elements are made of glass, the freedom for distributing the refractive power of the image capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing lens system can be effectively reduced.

In the present image capturing lens system, there can be at least one stop provided, such as an aperture stop, a glare stop or a field stop. Said glare stop or said field stop is for eliminating the stray light and thereby improving the image resolution thereof.

In the present image capturing lens system, an aperture stop can be configured as a front stop or a middle stop. A front stop can provide a longer distance between an exit pupil of the system and an image plane, and the image-sensing efficiency of an image sensor can be improved. A middle stop is favorable for enlarging the field of view of the system and thereby provides a wider field of view for the same.

In the present image capturing lens system, if a lens element is described to have a convex surface, it means the portion of the surface in proximity to the optical axis is convex; if a lens element is described to have a concave surface, it means the portion of the surface in proximity to the optical axis is concave. A critical point is referred as a tangential point on a surface of the lens element concerned where the corresponding tangent through the critical point is perpendicular to the optical axis.

Figure 11:
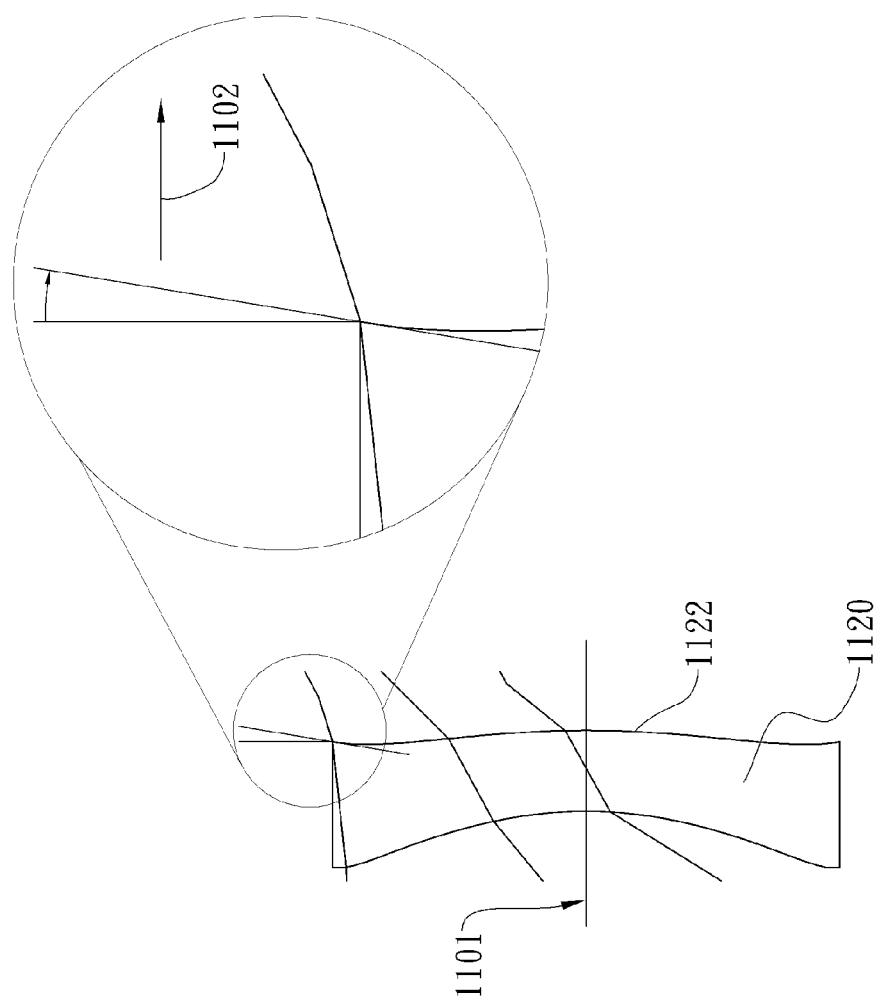
FIG. 11 shows the curvature feature of the second lens element of the present disclosure.

Please refer to FIG. 11. In the embodiment shown in this figure, the second lens element 1120 has a convex image-side surface 1122 at a paraxial region 1101, and the shape of the image-side surface 1122 changes toward the image-side 1102 while away from the paraxial region 1101.

Figure 12:
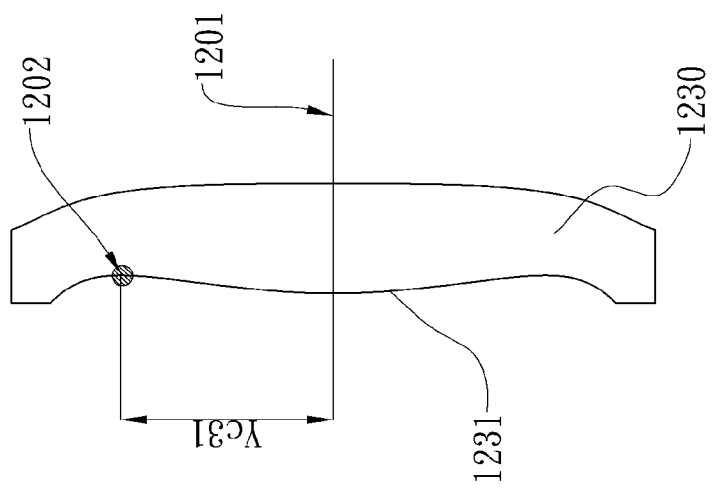
FIG. 12 indicates the distance represented by the relation of Yc31 of the present disclosure.

Please refer to FIG. 12. In the embodiment shown in this figure, a vertical distance with respect to the optical axis 1201 between a critical point 1202 on the object-side surface 1231 of the third lens element 1230 and the optical axis 1201 is Yc31; wherein the critical point 1202 is not on the optical axis 1201.

The present image capturing lens system can be optionally applied to lens-subgroup-focusing systems and zoom systems. In addition, as the image capturing lens system has the advantages of superior aberration correction ability and finer image quality, it is suitable for applications in imaging systems such as 3D (3 dimensional) image capturing, digital cameras, portable devices, digital tablets and etc.

Preferred embodiments of the present disclosure will be described in the following paragraphs by referring to the accompanying drawings.

Embodiment 1

Figure 1B:
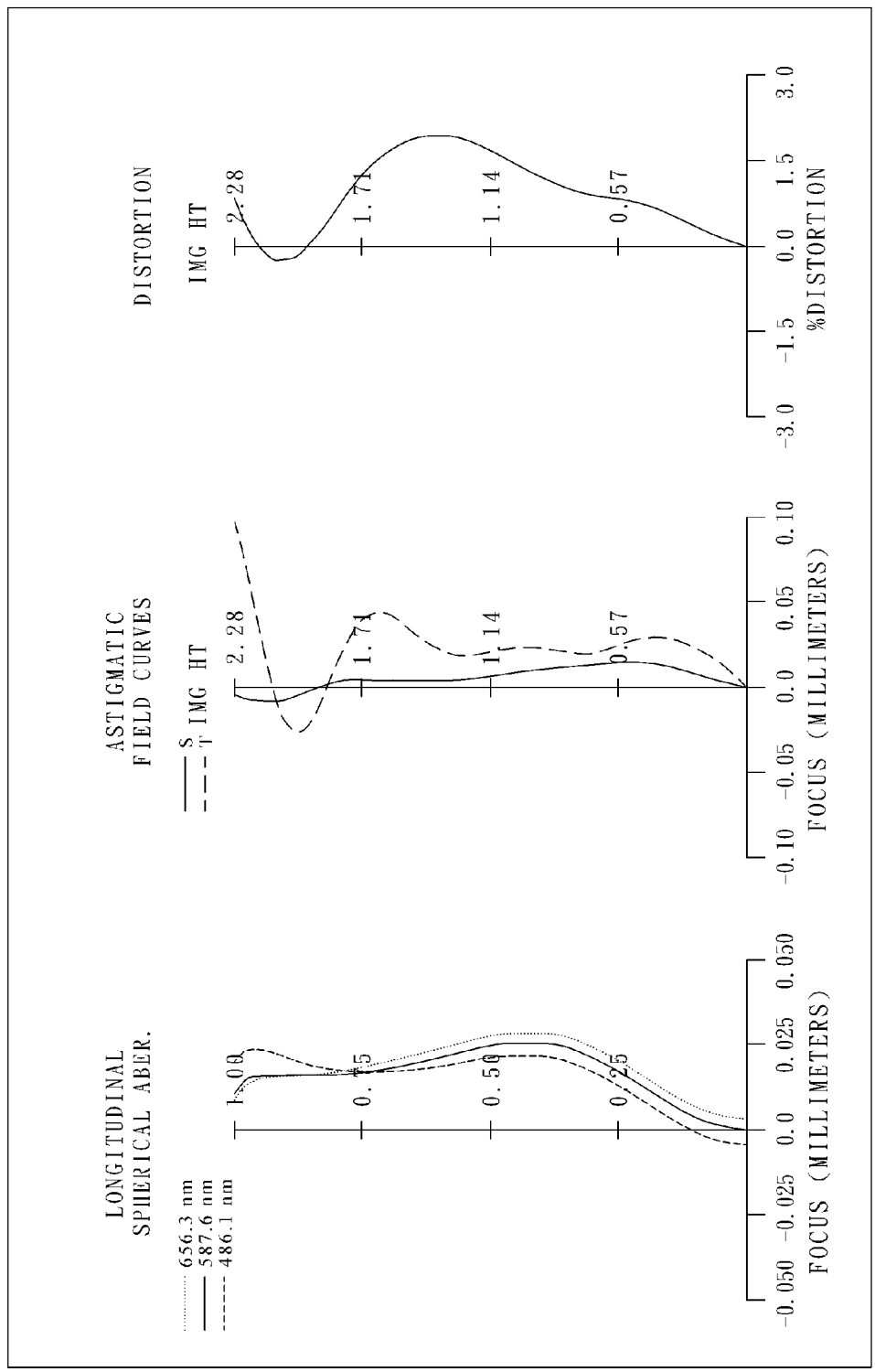
FIG. 1B shows the aberration curves of the first embodiment of the present disclosure.

FIG. 1A shows an image capturing lens system in accordance with the first embodiment of the present disclosure, and FIG. 1B shows the aberration curves of the first embodiment of the present disclosure. The image capturing lens system of the first embodiment of the present disclosure mainly comprises five lens elements, in order from an object side to an image side:

a first lens element 110 made of plastic with positive refractive power having a convex object-side surface 111 at a paraxial region and a concave image-side surface 112 at a paraxial region, the object-side and image-side surfaces 111 and 112 thereof being aspheric;

a second lens element 120 made of plastic with negative refractive power having a concave object-side surface 121 at a paraxial region and a convex image-side surface 122 at a paraxial region, the shape of the image-side surface 122 changing toward the image-side while away from the paraxial region, and the object-side and image-side surfaces 121 and 122 thereof being aspheric;

a third lens element 130 made of plastic with positive refractive power having a convex object-side surface 131 at a paraxial region and a convex image-side surface 132 at a paraxial region, the object-side and image-side surfaces 131 and 132 thereof being aspheric;

a fourth lens element 140 made of plastic with negative refractive power having a concave object-side surface 141 at a paraxial region and a convex image-side surface 142 at a paraxial region, the object-side and image-side surfaces 141 and 142 thereof being aspheric; and a fifth lens element 150 made of plastic with negative refractive power having a convex object-side surface 151 at a paraxial region and a concave image-side surface 152 at a paraxial region, the shape of the image-side surface 152 changing from concave at the paraxial region thereof to convex while away from the paraxial region thereof, and the object-side and image-side surfaces 151 and 152 thereof being aspheric;

wherein a stop 100, which is an aperture stop, is disposed between the imaged object and the first lens element 110; the image capturing lens system further comprises an IR-cut filter 160 disposed between the image-side surface 152 of the fifth lens element 150 and an image plane 170, and the IR-cut filter 160 is made of glass and has no influence on the focal length of the image capturing lens system.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)
f = 3.04 mm, Fno = 2.30, HFOV = 36.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.132 | | | | |
| 2 | Lens 1 | 1.362 ASP | 0.511 | Plastic | 1.544 | 55.9 | 2.51 |
| 3 | | 325.338 ASP | 0.218 | | | | |
| 4 | Lens 2 | −1.286 ASP | 0.252 | Plastic | 1.640 | 23.3 | −3.42 |
| 5 | | −3.360 ASP | 0.133 | | | | |
| 6 | Lens 3 | 2.030 ASP | 0.325 | Plastic | 1.544 | 55.9 | 3.56 |
| 7 | | −40.316 ASP | 0.409 | | | | |
| 8 | Lens 4 | −0.968 ASP | 0.327 | Plastic | 1.544 | 55.9 | −28.86 |
| 9 | | −1.154 ASP | 0.233 | | | | |
| 10 | Lens 5 | 1.532 ASP | 0.558 | Plastic | 1.535 | 56.3 | −9.93 |
| 11 | | 1.038 ASP | 0.400 | | | | |
| 12 | IR-filter | Plano | 0.210 | Glass | 1.517 | 64.2 | — |
| 13 | | Plano | 0.306 | | | | |
| 14 | Image | Plano | — | | | | |

Note:
Reference Wavelength is 587.6 nm (d-line).

TABLE 2

Aspheric Coefficients

| Surface # | 2 | 3 | 4 | 5 | 6 |
|---|---|---|---|---|---|
| k = | −1.3280E+00 | −1.0000E+00 | −2.1432E+00 | 4.0807E+00 | −1.1120E+01 |
| A4 = | 2.2511E−02 | −1.3282E−01 | 6.0044E−02 | 3.7575E−03 | −2.1144E−01 |
| A6 = | 1.8294E−01 | −2.7650E−01 | 8.1600E−02 | 5.7773E−01 | 4.3259E−01 |
| A8 = | −1.2247E+00 | 2.7559E−01 | −7.1508E−01 | −8.3978E−01 | −1.6824E+00 |
| A10 = | 2.9496E+00 | −1.4279E+00 | 9.5105E−01 | −7.9688E−02 | 4.1298E+00 |
| A12 = | −4.0863E+00 | 2.2040E+00 | 7.3476E−01 | 1.7537E+00 | −7.1344E+00 |
| A14 = | 1.3267E+00 | −1.1185E+00 | −7.7139E−01 | −1.2358E+00 | 4.1876E+00 |

| Surface # | 7 | 8 | 9 | 10 | 11 |
|---|---|---|---|---|---|
| k = | −2.0000E+01 | −1.3297E+00 | −2.7270E+00 | −1.6956E+01 | −4.8480E+00 |
| A4 = | −7.8272E−02 | 6.0388E−03 | −3.1369E−01 | −1.7264E−01 | −1.6786E−01 |
| A6 = | −3.6220E−01 | −4.1092E−01 | 5.5034E−01 | −1.5042E−04 | 1.3013E−01 |
| A8 = | 1.1927E+00 | 5.2337E−01 | −9.7581E−01 | 9.1191E−02 | −8.3338E−02 |
| A10 = | −1.8874E+00 | 9.5559E−01 | 1.3898E+00 | −8.8919E−02 | 3.2090E−02 |
| A12 = | 9.6507E−01 | −1.4911E+00 | −9.0385E−01 | 3.4931E−02 | −7.1485E−03 |
| A14 = | 4.6798E−02 | 5.0431E−01 | 2.0468E−01 | −4.7059E−03 | 6.8980E−04 |

The equation of the aspheric surface profiles is expressed as follows:

$$X(Y) = (Y^2/R)/(1 + sqrt(1 - (1+k)*(Y/R)^2)) + \sum_{i} (Ai)*(Y^i)$$

wherein:

X: the relative distance between a point on the aspheric surface at a distance Y from the optical axis and the tangential plane at the aspheric surface vertex;

Y: the vertical distance from the point on the curve of the aspheric surface to the optical axis;

R: the curvature radius;

k: the conic coefficient;

Ai: the aspheric coefficient of order i.

In the first embodiment of the present image capturing lens system, the focal length of the image capturing lens system is f, and it satisfies the following relation:

$f$=3.04 (mm).

In the first embodiment of the present image capturing lens system, the f-number of the image capturing lens system is Fno, and it satisfies the relation:

$Fno$=2.30.

In the first embodiment of the present image capturing lens system, half of the maximal field of view of the image capturing lens system is HFOV, and it satisfies the relation:

$HFOV$=36.6 deg.

In the first embodiment of the present image capturing lens system, an Abbe number of the second lens element 120 is V2, an Abbe number of the first lens element 110 is V1, and they satisfy the relation:

$V2/V1$=0.42.

In the first embodiment of the present image capturing lens system, a central thickness of the third lens element 130 is CT3, a vertical distance with respect to the optical axis between a non-axial critical point on the object-side surface 131 of the third lens element 130 and the optical axis is Yc31, and they satisfy the relation:

$CT3/Yc31$=0.52.

In the first embodiment of the present image capturing lens system, a curvature radius of the object-side surface 121 of the second lens element 120 is R3, a curvature radius of the image-side surface 122 of the second lens element 120 is R4, and they satisfy the relation:

(R3+R4)/(R3−R4)=−2.24.

In the first embodiment of the present image capturing lens system, a curvature radius of the object-side surface 131 of the third lens element 130 is R5, a curvature radius of the image-side surface 132 of the third lens element 130 is R6, and they satisfy the relation:

(R5+R6)/(R5−R6)=−0.90.

In the first embodiment of the present image capturing lens system, a curvature radius of the object-side surface 141 of the fourth lens element 140 is R7, a curvature radius of the image-side surface 142 of the fourth lens element 140 is R8, and they satisfy the relation:

|(R7−R8)/(R7+R8)|=0.09.

In the first embodiment of the present image capturing lens system, a focal length of the image capturing lens system is f, a focal length of the fourth lens element 140 is f4, and they satisfy the relation:

|f/f4|=0.11.

In the first embodiment of the present image capturing lens system, a focal length of the image capturing lens system is f, a focal length of the fifth lens element 150 is f5, and they satisfy the relation:

f/f5=−0.31.

In the first embodiment of the present image capturing lens system, a focal length of the image capturing lens system is f, a focal length of the fourth lens element 140 is f4, a focal length of the fifth lens element 150 is f5, a focal length of the third lens element 130 is f3, and they satisfy the relation:

(|f/f4|+|f/f5|)/(f/f3)=0.48.

Embodiment 2

Figure 2A:
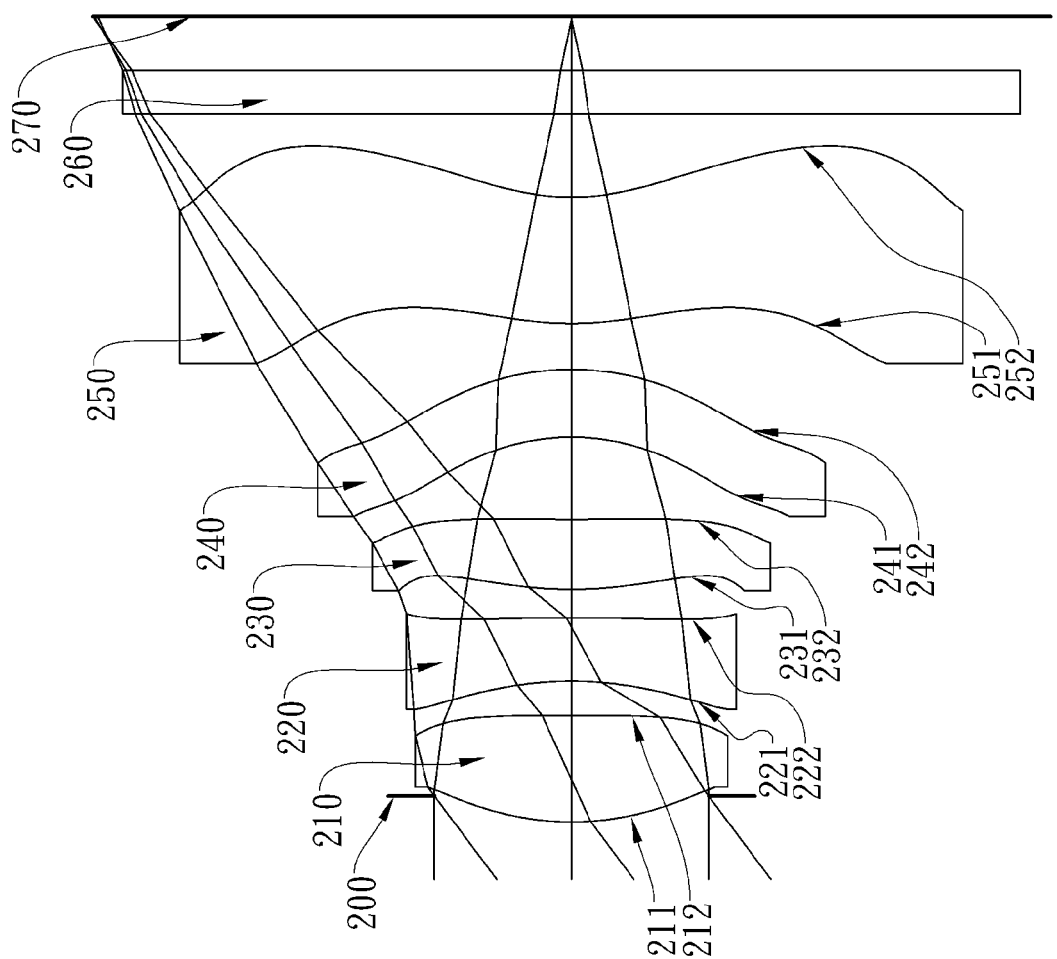
FIG. 2A shows an image capturing lens system in accordance with the second embodiment of the present disclosure.
Figure 2B:
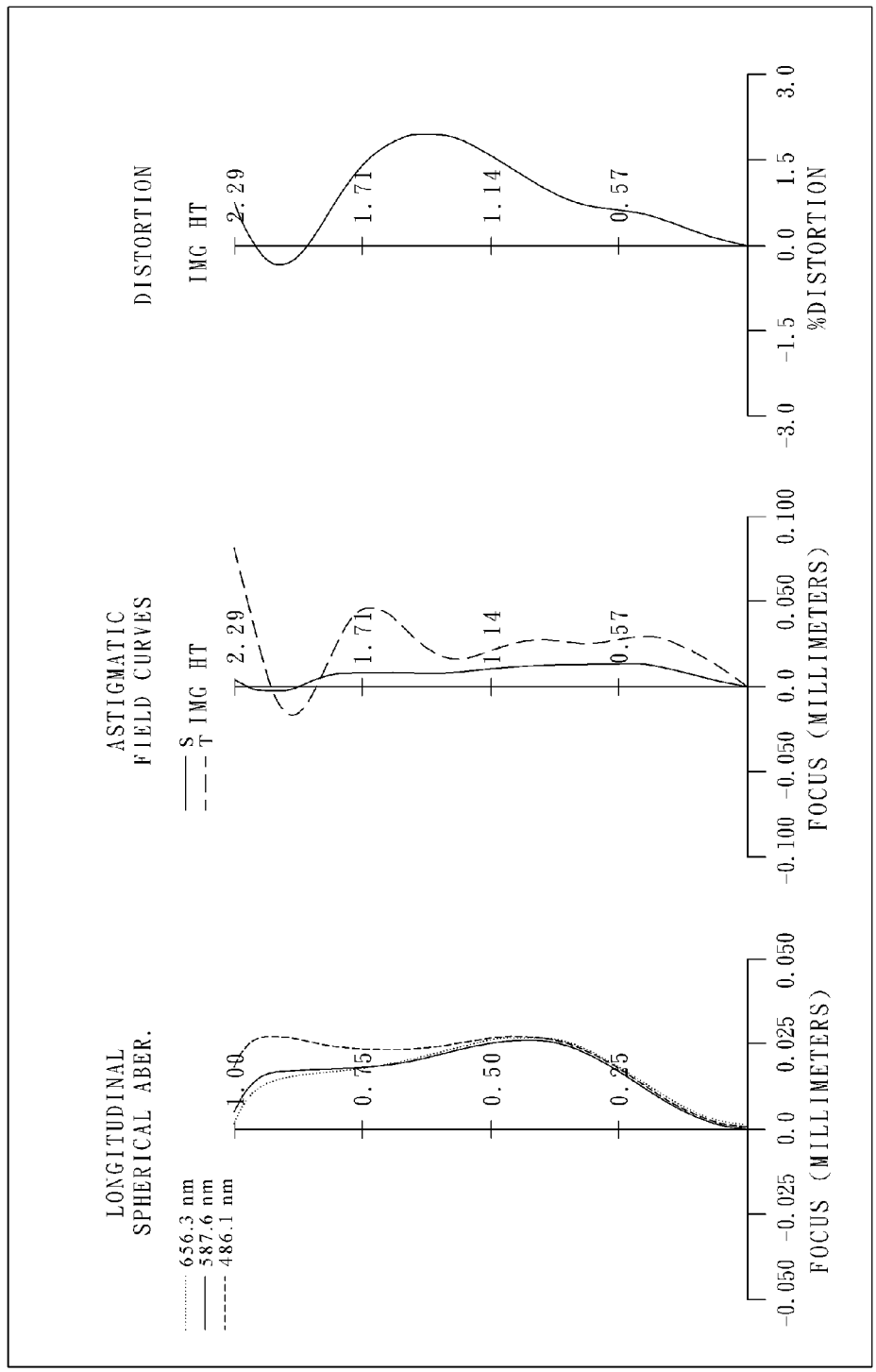
FIG. 2B shows the aberration curves of the second embodiment of the present disclosure.

FIG. 2A shows an image capturing lens system in accordance with the second embodiment of the present disclosure, and FIG. 2B shows the aberration curves of the second embodiment of the present disclosure. The image capturing lens system of the second embodiment of the present disclosure mainly comprises five lens elements, in order from an object side to an image side:

a first lens element 210 made of plastic with positive refractive power having a convex object-side surface 211 at a paraxial region and a convex image-side surface 212 at a paraxial region, the object-side and image-side surfaces 211 and 212 thereof being aspheric;

a second lens element 220 made of plastic with negative refractive power having a concave object-side surface 221 at a paraxial region and a convex image-side surface 222 at a paraxial region, the shape of the image-side surface 222 changing toward the image-side while away from the paraxial region, and the object-side and image-side surfaces 221 and 222 thereof being aspheric;

a third lens element 230 made of plastic with positive refractive power having a convex object-side surface 231 at a paraxial region and a concave image-side surface 232 at a paraxial region, the object-side and image-side surfaces 231 and 232 thereof being aspheric;

a fourth lens element 240 made of plastic with negative refractive power having a concave object-side surface 241 at a paraxial region and a convex image-side surface 242 at a paraxial region, the object-side and image-side surfaces 241 and 242 thereof being aspheric; and a fifth lens element 250 made of plastic with negative refractive power having a convex object-side surface 251 at a paraxial region and a concave image-side surface 252 at a paraxial region, the shape of the image-side surface 252 changing from concave at the paraxial region thereof to convex while away from the paraxial region thereof, and the object-side and image-side surfaces 251 and 252 thereof being aspheric;

wherein a stop 200, which is an aperture stop, is disposed between the imaged object and the first lens element 210; the image capturing lens system further comprises an IR-cut filter 260 disposed between the image-side surface 252 of the fifth lens element 250 and an image plane 270, and the IR-cut filter 260 is made of glass and has no influence on the focal length of the image capturing lens system.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 3.02 mm, Fno = 2.30, HFOV = 36.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.124 | | | | |
| 2 | Lens 1 | 1.341 ASP | 0.511 | Plastic | 1.544 | 55.9 | 2.38 |
| 3 | | −33.327 ASP | 0.164 | | | | |
| 4 | Lens 2 | −1.662 ASP | 0.303 | Plastic | 1.640 | 23.3 | −3.08 |
| 5 | | −11.440 ASP | 0.136 | | | | |
| 6 | Lens 3 | 1.777 ASP | 0.336 | Plastic | 1.544 | 55.9 | 3.61 |
| 7 | | 17.228 ASP | 0.395 | | | | |
| 8 | Lens 4 | −1.052 ASP | 0.324 | Plastic | 1.544 | 55.9 | −14.34 |
| 9 | | −1.347 ASP | 0.221 | | | | |
| 10 | Lens 5 | 1.421 ASP | 0.605 | Plastic | 1.535 | 56.3 | −15.26 |
| 11 | | 1.031 ASP | 0.400 | | | | |
| 12 | IR-filter | Plano | 0.210 | Glass | 1.517 | 64.2 | — |
| 13 | | Plano | 0.256 | | | | |
| 14 | Image | Plano | — | | | | |

Note:
Reference Wavelength is 587.6 nm (d-line).

TABLE 4

Aspheric Coefficients

| Surface # | 2 | 3 | 4 | 5 | 6 |
|---|---|---|---|---|---|
| k = | −1.2985E+00 | −1.0000E+00 | −2.2910E+00 | 2.0000E+01 | −8.4154E+00 |
| A4 = | 2.3562E−02 | −1.2720E−01 | 6.1090E−02 | −3.9019E−02 | −2.0099E−01 |
| A6 = | 1.7782E−01 | −2.6463E−01 | 7.9998E−02 | 5.6343E−01 | 4.3412E−01 |
| A8 = | −1.2287E+00 | 2.7408E−01 | −7.1756E−01 | −8.3748E−01 | −1.7009E+00 |
| A10 = | 2.9289E+00 | −1.4207E+00 | 9.3992E−01 | −6.8154E−02 | 4.0855E+00 |
| A12 = | −4.0865E+00 | 2.2039E+00 | 7.3491E−01 | 1.7674E+00 | −7.1344E+00 |
| A14 = | 1.3267E+00 | −1.1188E+00 | −7.7107E−01 | −1.2359E+00 | 4.1877E+00 |

| Surface # | 7 | 8 | 9 | 10 | 11 |
|---|---|---|---|---|---|
| k = | 1.9918E+01 | −1.4139E+00 | −2.4979E+00 | −1.3400E+01 | −4.3969E+00 |
| A4 = | −8.0892E−02 | 7.1487E−03 | −2.9799E−01 | −1.7791E−01 | −1.6704E−01 |
| A6 = | −3.6222E−01 | −4.1699E−03 | 5.5441E−01 | 1.5728E−01 | 1.3155E−01 |
| A8 = | 1.1821E+00 | 5.2475E−01 | −9.7952E−01 | 9.1437E−02 | −8.3474E−02 |
| A10 = | −1.8945E+00 | 9.5544E−01 | 1.3886E+00 | −8.8952E−02 | 3.2133E−02 |
| A12 = | 9.6277E−01 | −1.4931E+00 | −9.0408E−01 | 3.4909E−02 | −7.1609E−03 |
| A14 = | 4.4738E−02 | 5.0161E−01 | 2.0490E−01 | −4.7073E−03 | 6.8408E−04 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f [mm] | 3.02 | (R5 + R6)/(R5 − R6) | −1.23 |
|---|---|---|---|
| Fno | 2.30 | |(R7 − R8)/(R7 + R8)| | 0.12 |
| HFOV [Deg.] | 36.8 | |f/f4| | 0.21 |
| V2/V1 | 0.42 | f/f5 | −0.20 |
| CT3/Yc31 | 0.53 | (|f/f4| + |f/f5|)/(f/f3) | 0.49 |
| (R3 + R4)/(R3 − R4) | −1.34 | | |

Embodiment 3

Figure 3A:
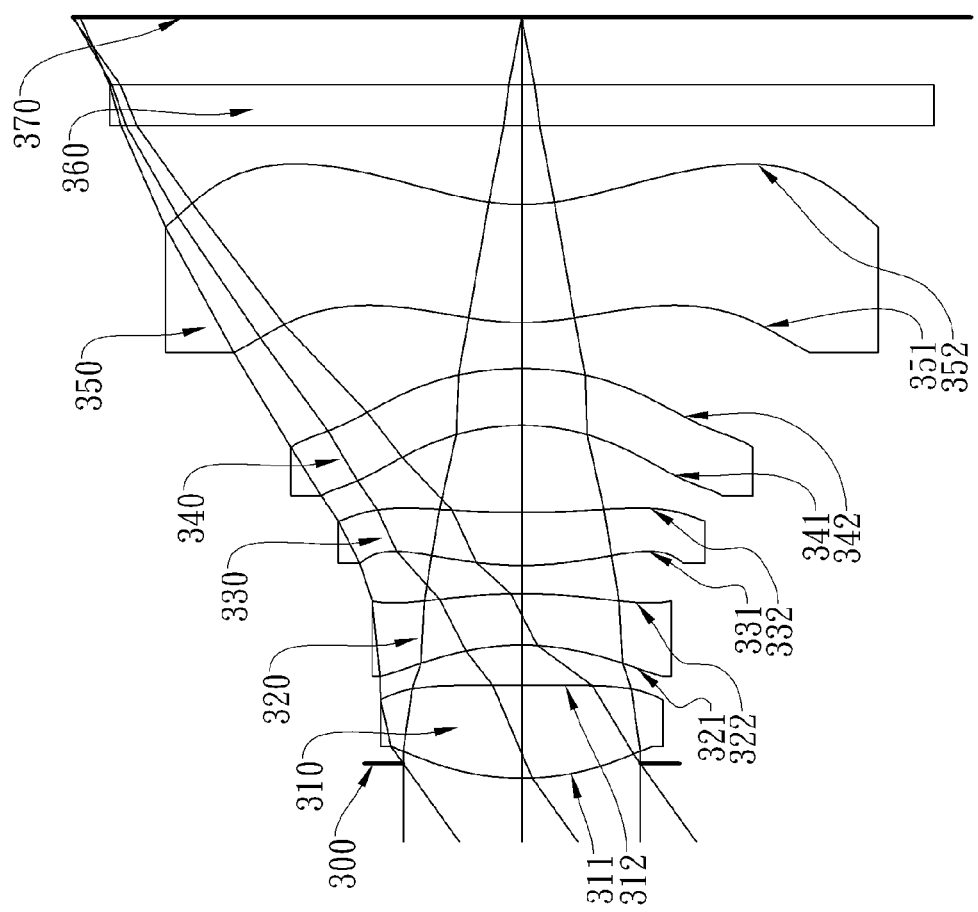
FIG. 3A shows an image capturing lens system in accordance with the third embodiment of the present disclosure.
Figure 3B:
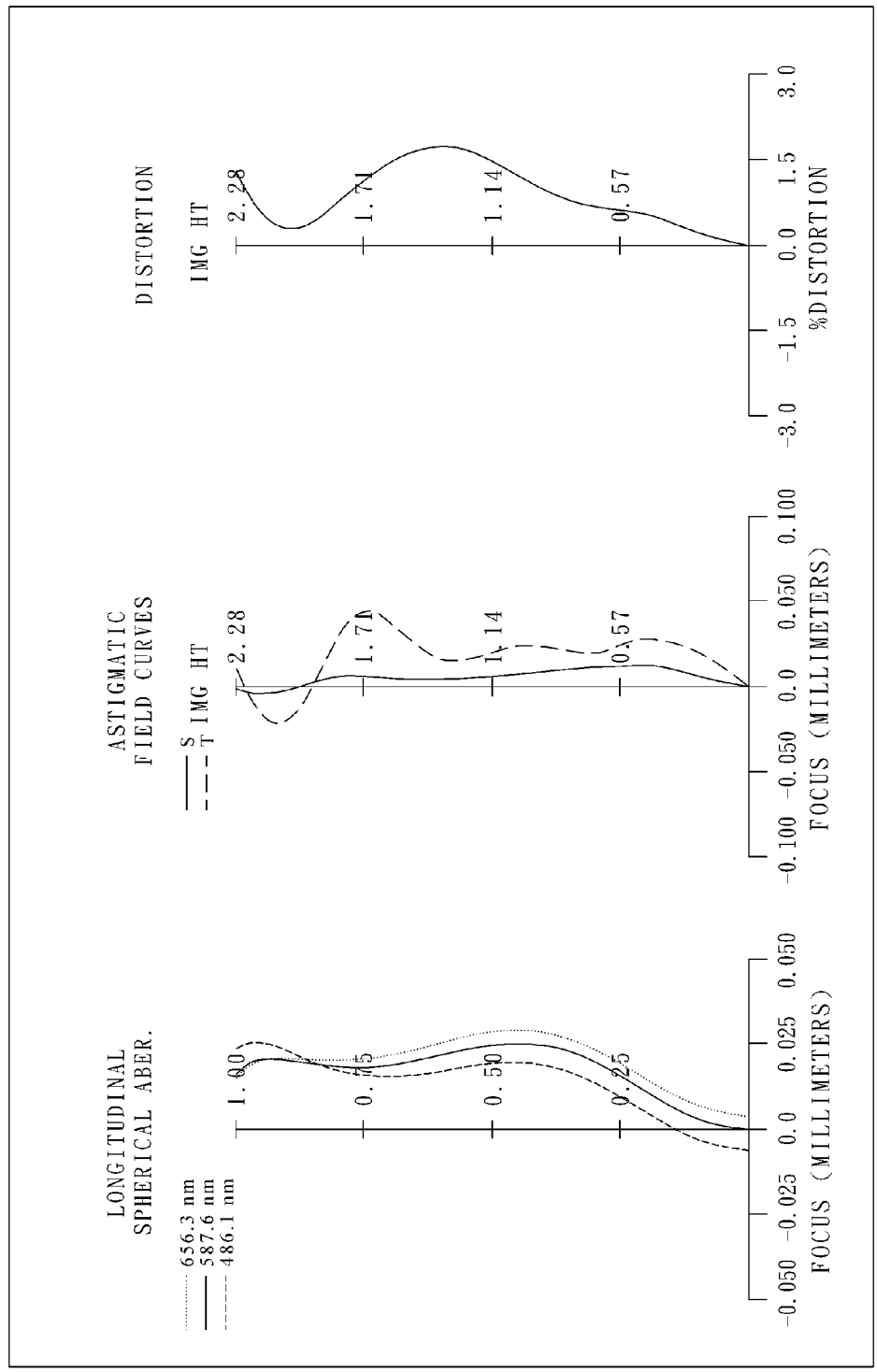
FIG. 3B shows the aberration curves of the third embodiment of the present disclosure.

FIG. 3A shows an image capturing lens system in accordance with the third embodiment of the present disclosure, and FIG. 3B shows the aberration curves of the third embodiment of the present disclosure. The image capturing lens system of the third embodiment of the present disclosure mainly comprises five lens elements, in order from an object side to an image side:

a first lens element 310 made of plastic with positive refractive power having a convex object-side surface 311 at a paraxial region and a concave image-side surface 312 at a paraxial region, the object-side and image-side surfaces 311 and 312 thereof being aspheric;

a second lens element 320 made of plastic with negative refractive power having a concave object-side surface 321 at a paraxial region and a convex image-side surface 322 at a paraxial region, the shape of the image-side surface 322 changing toward the image-side while away from the paraxial region, and the object-side and image-side surfaces 321 and 322 thereof being aspheric;

a third lens element 330 made of plastic with positive refractive power having a convex object-side surface 331 at a paraxial region and a concave image-side surface 332 at a paraxial region, the object-side and image-side surfaces 331 and 332 thereof being aspheric;

a fourth lens element 340 made of plastic with negative refractive power having a concave object-side surface 341 at a paraxial region and a convex image-side surface 342 at a paraxial region, the object-side and image-side surfaces 341 and 342 thereof being aspheric; and a fifth lens element 350 made of plastic with positive refractive power having a convex object-side surface 351 at a paraxial region and a concave image-side surface 352 at a paraxial region, the shape of the image-side surface 352 changing from concave at the paraxial region thereof to convex while away from the paraxial region thereof, and the object-side and image-side surfaces 351 and 352 thereof being aspheric;

wherein a stop 300, which is an aperture stop, is disposed between the imaged object and the first lens element 310; the image capturing lens system further comprises an IR-cut filter 360 disposed between the image-side surface 352 of the fifth lens element 350 and an image plane 370, and the IR-cut filter 360 is made of glass and has no influence on the focal length of the image capturing lens system.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

TABLE 6

(Embodiment 3)
f = 3.14 mm, Fno = 2.60, HFOV = 35.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.076 | | | | |
| 2 | Lens 1 | 1.302 ASP | 0.473 | Plastic | 1.544 | 55.9 | 2.51 |
| 3 | | 24.508 ASP | 0.208 | | | | |

TABLE 6-continued (Embodiment 3)
f = 3.14 mm, Fno = 2.60, HFOV = 35.5 deg.

| Surface # | | Curvature Radius | | Thickness | Material | Index | Abbe # | Focal Length |
|---|---|---|---|---|---|---|---|---|
| 4 | Lens 2 | −1.283 | ASP | 0.261 | Plastic | 1.640 | 23.3 | −3.82 |
| 5 | | −2.913 | ASP | 0.144 | | | | |
| 6 | Lens 3 | 1.596 | ASP | 0.270 | Plastic | 1.544 | 55.9 | 4.60 |
| 7 | | 4.139 | ASP | 0.445 | | | | |
| 8 | Lens 4 | −1.177 | ASP | 0.290 | Plastic | 1.544 | 55.9 | −8.58 |
| 9 | | −1.710 | ASP | 0.235 | | | | |
| 10 | Lens 5 | 1.337 | ASP | 0.603 | Plastic | 1.535 | 56.3 | 91.99 |
| 11 | | 1.158 | ASP | 0.400 | | | | |
| 12 | IR-filter | Plano | | 0.210 | Glass | 1.517 | 64.2 | — |
| 13 | | Plano | | 0.344 | | | | |
| 14 | Image | Plano | | — | | | | |

Note:
Reference Wavelength is 587.6 nm (d-line).

TABLE 7

Aspheric Coefficients

| Surface # | 2 | 3 | 4 | 5 | 6 |
|---|---|---|---|---|---|
| k = | −1.2487E+00 | −1.0000E+00 | −2.4615E+00 | 2.5583E+00 | −6.9186E+00 |
| A4 = | 2.5561E−02 | −1.4051E−01 | 6.5273E−02 | 6.8599E−03 | −2.2740E−01 |
| A6 = | 1.7727E−01 | −2.9054E−01 | 6.6311E−02 | 6.2681E−01 | 4.1043E−01 |
| A8 = | −1.2128E+00 | 1.8364E−01 | −6.5962E−01 | −8.2213E−01 | −1.6480E+00 |
| A10 = | 2.8177E+00 | −1.3884E+00 | 9.8649E−01 | −3.1506E−02 | 4.1271E+00 |
| A12 = | −4.1364E+00 | 2.2386E+00 | 7.5277E−01 | 1.7639E+00 | −7.1358E+00 |
| A14 = | 1.3085E+00 | −1.1050E+00 | −7.0801E−01 | −1.2369E+00 | 4.1910E+00 |

| Surface # | 7 | 8 | 9 | 10 | 11 |
|---|---|---|---|---|---|
| k = | −1.3772E+01 | −1.4719E+00 | −1.7548E+00 | −1.1298E+01 | −4.5800E+00 |
| A4 = | −8.7926E−02 | 3.0055E−03 | −3.0964E−01 | −1.7523E−01 | −1.7135E−01 |
| A6 = | −3.6436E−01 | −4.4625E−01 | 5.5121E−01 | 1.0142E−04 | 1.2917E−01 |
| A8 = | 1.1751E+00 | 5.1400E−01 | −9.7942E−01 | 9.1160E−02 | −8.3309E−02 |
| A10 = | −1.8858E+00 | 9.5809E−01 | 1.3887E+00 | −8.8926E−02 | 3.2100E−02 |
| A12 = | 9.6918E−01 | −1.4890E+00 | −9.0353E−01 | 3.4918E−02 | −7.1278E−03 |
| A14 = | 5.0123E−02 | 5.0814E−01 | 2.0523E−01 | −4.7031E−03 | 6.9015E−04 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f [mm] | 3.14 | (R5 + R6)/(R5 − R6) | −2.25 |
|---|---|---|---|
| Fno | 2.60 | |(R7 − R8)/(R7 + R8)| | 0.18 |
| HFOV [Deg.] | 35.5 | |f/f4| | 0.37 |
| V2/V1 | 0.42 | f/f5 | 0.03 |
| CT3/Yc31 | 0.42 | (|f/f4| + |f/f5|)/(f/f3) | 0.59 |
| (R3 + R4)/(R3 − R4) | −2.57 | | |

Embodiment 4

Figure 4A:
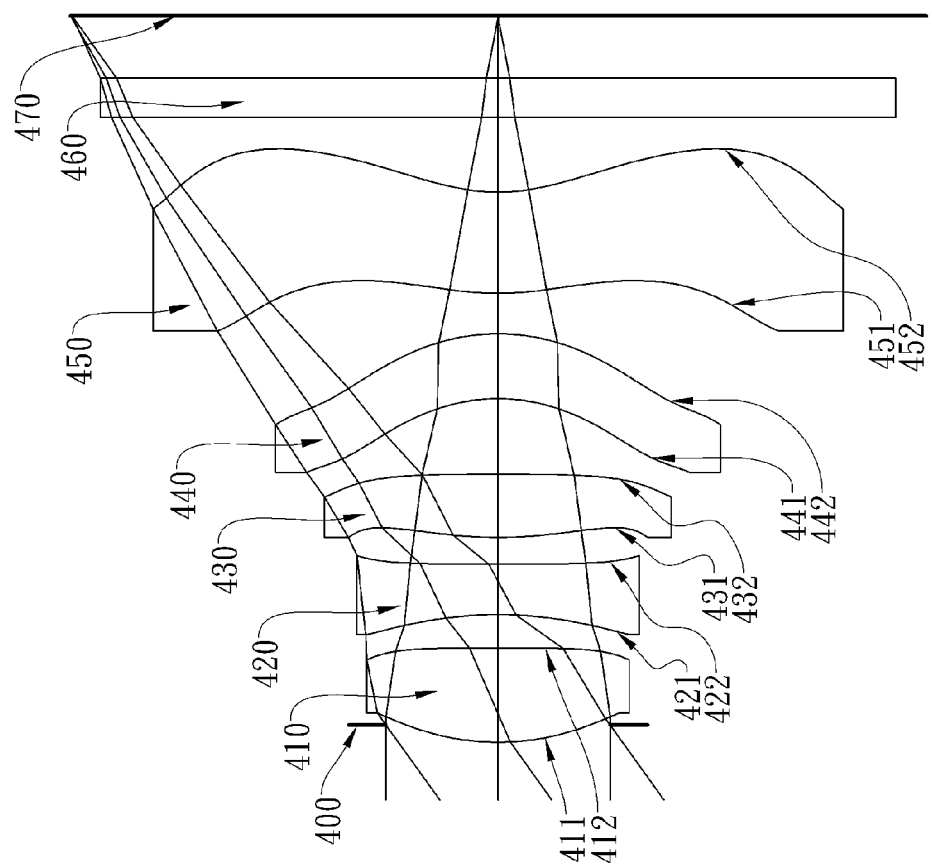
FIG. 4A shows an image capturing lens system in accordance with the fourth embodiment of the present disclosure.
Figure 4B:
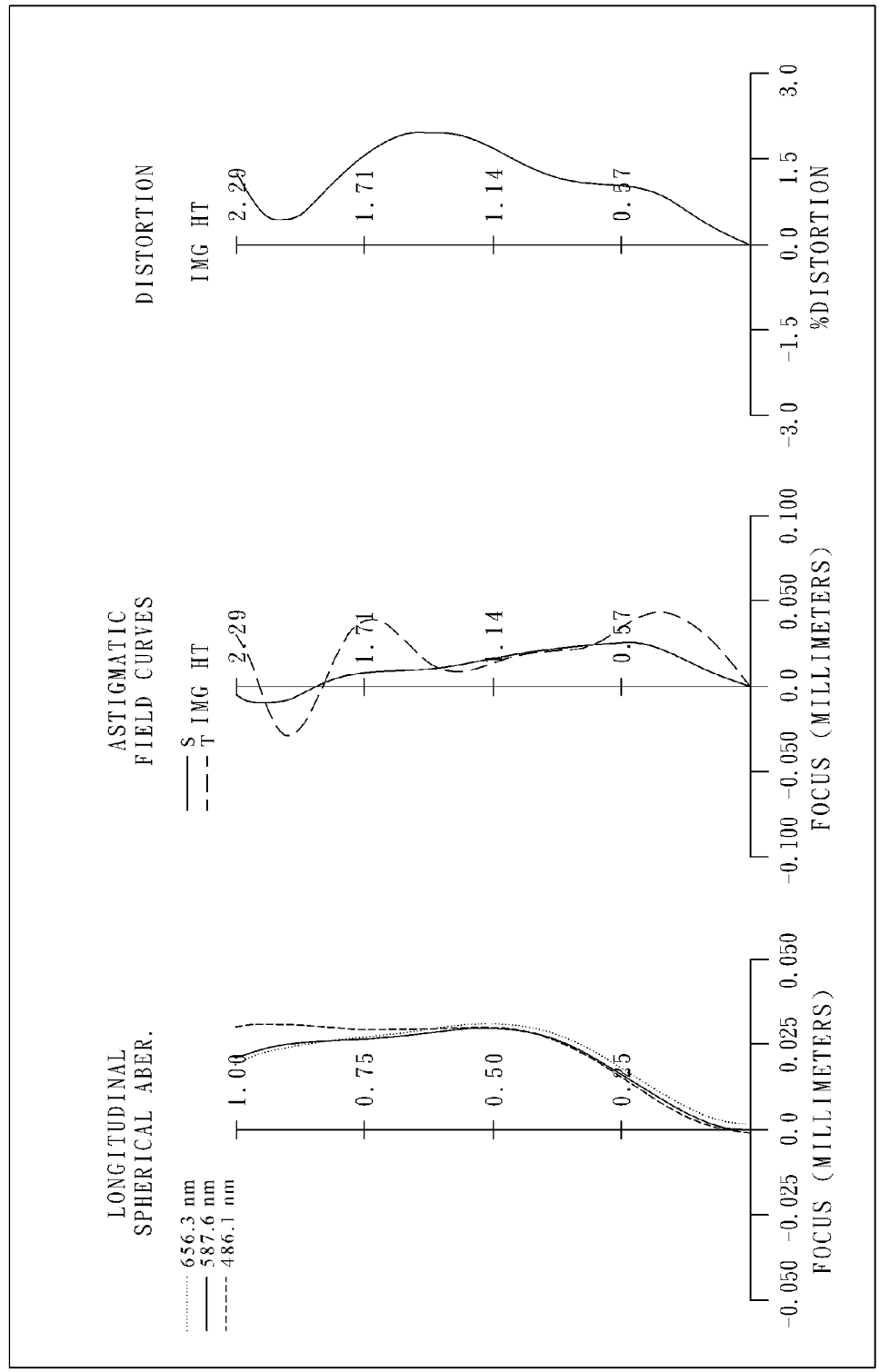
FIG. 4B shows the aberration curves of the fourth embodiment of the present disclosure.

FIG. 4A shows an image capturing lens system in accordance with the fourth embodiment of the present disclosure, and FIG. 4B shows the aberration curves of the fourth embodiment of the present disclosure. The image capturing lens system of the fourth embodiment of the present disclosure mainly comprises five lens elements, in order from an object side to an image side:

a first lens element 410 made of plastic with positive refractive power having a convex object-side surface 411 at a paraxial region and a concave image-side surface 412 at a paraxial region, the object-side and image-side surfaces 411 and 412 thereof being aspheric;

a second lens element 420 made of plastic with negative refractive power having a concave object-side surface 421 at a paraxial region and a concave image-side surface 422 at a paraxial region;

a third lens element 430 made of plastic with positive refractive power having a convex object-side surface 431 at a paraxial region and a convex image-side surface 432 at a paraxial region, the object-side and image-side surfaces 431 and 432 thereof being aspheric;

a fourth lens element 440 made of plastic with negative refractive power having a concave object-side surface 441 at a paraxial region and a convex image-side surface 442 at a paraxial region, the object-side and image-side surfaces 441 and 442 thereof being aspheric; and a fifth lens element 450 made of plastic with negative refractive power having a convex object-side surface 451 at a paraxial region and a concave image-side surface 452 at a paraxial region, the shape of the image-side surface 452 changing from concave at the paraxial region thereof to convex while away from the paraxial region thereof, and the object-side and image-side surfaces 451 and 452 thereof being aspheric;

wherein a stop 400, which is an aperture stop, is disposed between the imaged object and the first lens element 410; the image capturing lens system further comprises an IR-cut filter 460 disposed between the image-side surface 452 of the fifth lens element 450 and an image plane 470, and the IR-cut filter 460 is made of glass and has no influence on the focal length of the image capturing lens system.

The detailed optical data of the fourth embodiment is shown in TABLE 9, and the aspheric surface data is shown in TABLE 10, wherein the units of the curvature radius, the thickness and the focal length are expressed in mm, and HFOV is half of the maximal field of view.

TABLE 9

(Embodiment 4)
f = 3.12 mm, Fno = 2.60, HFOV = 35.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.092 | | | | |
| 2 | Lens 1 | 1.308 ASP | 0.503 | Plastic | 1.544 | 55.9 | 2.43 |
| 3 | | 91.718 ASP | 0.180 | | | | |
| 4 | Lens 2 | −2.046 ASP | 0.270 | Plastic | 1.640 | 23.3 | −3.09 |
| 5 | | 62.469 ASP | 0.142 | | | | |
| 6 | Lens 3 | 2.049 ASP | 0.337 | Plastic | 1.544 | 55.9 | 3.69 |
| 7 | | −97.244 ASP | 0.406 | | | | |
| 8 | Lens 4 | −0.964 ASP | 0.347 | Plastic | 1.544 | 55.9 | −113.27 |
| 9 | | −1.104 ASP | 0.216 | | | | |
| 10 | Lens 5 | 1.462 ASP | 0.542 | Plastic | 1.535 | 56.3 | −8.20 |
| 11 | | 0.955 ASP | 0.400 | | | | |
| 12 | IR-filter | Plano | 0.210 | Glass | 1.517 | 64.2 | — |
| 13 | | Plano | 0.332 | | | | |
| 14 | Image | Plano | — | | | | |

Note:
Reference Wavelength is 587.6 nm (d-line).

TABLE 10

Aspheric Coefficients

| Surface # | 2 | 3 | 4 | 5 | 6 |
|---|---|---|---|---|---|
| k = | −1.3319E+00 | −1.0000E+00 | −2.0112E+00 | −8.1743E+01 | −9.7232E+00 |
| A4 = | 2.9657E−02 | −1.2376E−01 | 5.1148E−02 | −2.8471E−02 | −2.1412E−01 |
| A6 = | 1.8348E−01 | −2.7082E−01 | 7.4429E−02 | 5.6726E−01 | 4.3500E−01 |
| A8 = | −1.2411E+00 | 2.4838E−01 | −7.2664E−01 | −8.4008E−01 | −1.6862E+00 |
| A10 = | 2.9389E+00 | −1.4330E+00 | 9.2314E−01 | −3.9804E−02 | 4.0798E+00 |
| A12 = | −4.0864E+00 | 2.2039E+00 | 7.3527E−01 | 1.7698E+00 | −7.1345E+00 |
| A14 = | 1.3268E+00 | −1.1185E+00 | −7.7137E−01 | −1.2360E+00 | 4.1876E+00 |

| Surface # | 7 | 8 | 9 | 10 | 11 |
|---|---|---|---|---|---|
| k = | −1.8682E+01 | −1.4199E+00 | −2.7935E+00 | −1.7262E+01 | −4.9475E+00 |
| A4 = | −8.1277E−02 | 9.5851E−03 | −3.0821E−01 | −1.6787E−01 | −1.7017E−01 |
| A6 = | −3.6440E−01 | −4.1453E−01 | 5.5005E−01 | 2.6822E−05 | 1.3083E−01 |
| A8 = | 1.1896E+00 | 5.2300E−01 | −9.7760E−01 | 9.0769E−02 | −8.3368E−02 |
| A10 = | −1.8819E+00 | 9.5505E−01 | 1.3893E+00 | −8.8962E−02 | 3.2082E−02 |
| A12 = | 9.7163E−01 | −1.4917E+00 | −9.0367E−01 | 3.4929E−02 | −7.1373E−03 |
| A14 = | 5.1061E−02 | 5.0424E−01 | 2.0503E−01 | −4.7021E−03 | 6.8712E−04 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f [mm] | 3.12 | (R5 + R6)/(R5 − R6) | −0.96 |
|---|---|---|---|
| Fno | 2.60 | |(R7 − R8)/(R7 + R8)| | 0.07 |
| HFOV [Deg.] | 35.7 | |f/f4| | 0.03 |
| V2/V1 | 0.42 | f/f5 | −0.38 |
| CT3/Yc31 | 0.53 | (|f/f4| + |f/f5|)/(f/f3) | 0.48 |
| (R3 + R4)/(R3 − R4) | −0.94 | | |

Embodiment 5

Figure 5A:
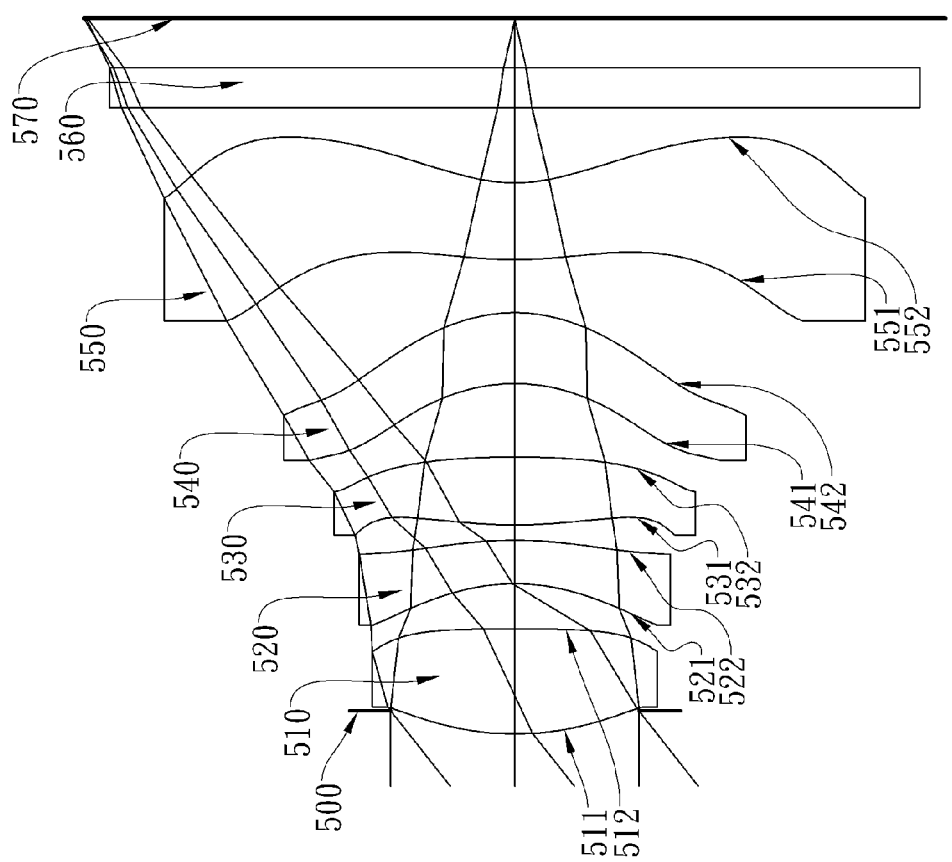
FIG. 5A shows an image capturing lens system in accordance with the fifth embodiment of the present disclosure.

FIG. 5A shows an image capturing lens system in accordance with the fifth embodiment of the present disclosure, and FIG. 5B shows the aberration curves of the fifth embodiment of the present disclosure. The image capturing lens system of the fifth embodiment of the present disclosure mainly comprises five lens elements, in order from an object side to an image side:

a first lens element 510 made of plastic with positive refractive power having a convex object-side surface 511 at a paraxial region and a convex image-side surface 512 at a paraxial region, the object-side and image-side surfaces 511 and 512 thereof being aspheric;

a second lens element 520 made of plastic with negative refractive power having a concave object-side surface 521 at a paraxial region and a convex image-side surface 522 at a paraxial region;

a third lens element 530 made of plastic with positive refractive power having a convex object-side surface 531 at a paraxial region and a convex image-side surface 532 at a paraxial region, the object-side and image-side surfaces 531 and 532 thereof being aspheric;

a fourth lens element 540 made of plastic with positive refractive power having a concave object-side surface 541 at a paraxial region and a convex image-side surface 542 at a paraxial region, the object-side and image-side surfaces 541 and 542 thereof being aspheric; and a fifth lens element 550 made of plastic with negative refractive power having a convex object-side surface 551 at a paraxial region and a concave image-side surface 552 at a paraxial region, the shape of the image-side surface 552 changing from concave at the paraxial region thereof to convex while away from the paraxial region thereof, and the object-side and image-side surfaces 551 and 552 thereof being aspheric;

wherein a stop 500, an aperture stop, is disposed between the imaged object and the first lens element 510; the image capturing lens system further comprises an IR-cut filter 560 disposed between the image-side surface 552 of the fifth lens element 550 and an image plane 570, and the IR-cut filter 560 is made of glass and has no influence on the focal length of the image capturing lens system.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)
f = 2.87 mm, Fno = 2.18, HFOV = 38.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.123 | | | | |
| 2 | Lens 1 | 1.462 ASP | 0.557 | Plastic | 1.543 | 56.5 | 2.55 |
| 3 | | −23.030 ASP | 0.241 | | | | |
| 4 | Lens 2 | −1.042 ASP | 0.230 | Plastic | 1.640 | 23.3 | −3.28 |
| 5 | | −2.247 ASP | 0.081 | | | | |
| 6 | Lens 3 | 2.371 ASP | 0.361 | Plastic | 1.544 | 55.9 | 3.07 |
| 7 | | −5.343 ASP | 0.390 | | | | |
| 8 | Lens 4 | −0.942 ASP | 0.376 | Plastic | 1.544 | 55.9 | 7.02 |
| 9 | | −0.862 ASP | 0.281 | | | | |
| 10 | Lens 5 | 1.925 ASP | 0.408 | Plastic | 1.535 | 56.3 | −3.26 |
| 11 | | 0.846 ASP | 0.400 | | | | |
| 12 | IR-filter | Plano | 0.210 | Glass | 1.517 | 64.2 | — |
| 13 | | Plano | 0.263 | | | | |
| 14 | Image | Plano | — | | | | |

Note:
Reference Wavelength is 587.6 nm (d-line).

TABLE 13

| Aspheric Coefficients | | | | | |
|---|---|---|---|---|---|
| Surface # | 2 | 3 | 4 | 5 | 6 |
| k = | −1.6705E+00 | −1.0000E+00 | −2.3155E+00 | −4.8356E+00 | −2.2126E+01 |
| A4 = | 1.1182E−02 | −1.6797E−01 | 7.0490E−02 | 2.8689E−02 | −1.8564E−01 |
| A6 = | 1.8833E−01 | −2.9849E−01 | 6.3480E−02 | 5.6755E−01 | 4.3440E−01 |
| A8 = | −1.2956E+00 | 3.2084E−01 | −8.0630E−02 | −8.6484E−01 | −1.7314E+00 |
| A10 = | 3.0336E+00 | −1.4132E+00 | 9.6818E−01 | −2.4468E−01 | 4.2004E+00 |
| A12 = | −4.0854E+00 | 2.1945E+00 | 7.3399E−01 | 1.7484E+00 | −7.1276E+00 |
| A14 = | 1.3267E+00 | −1.1185E+00 | −7.7139E−01 | −1.2317E+00 | 4.1872E+00 |

| Surface # | 7 | 8 | 9 | 10 | 11 |
|---|---|---|---|---|---|
| k = | −1.9772E+01 | −1.2247E+00 | −3.4296E+00 | −3.3419E+01 | −5.4150E+00 |
| A4 = | −9.3947E−02 | 4.0203E−03 | −3.6426E−01 | −1.7746E−01 | −1.6571E−01 |
| A6 = | −3.5266E−01 | −3.9768E−01 | 5.5745E−01 | −5.9797E−04 | 1.3102E−01 |
| A8 = | 1.2034E+00 | 5.2237E−01 | −9.6248E−01 | 9.1457E−02 | −8.3312E−02 |
| A10 = | −1.8855E+00 | 9.5966E−01 | 1.3938E+00 | −8.8856E−02 | 3.2004E−02 |
| A12 = | 9.7116E−01 | −1.4857E+00 | −9.0335E−01 | 3.4944E−02 | −7.1817E−03 |
| A14 = | 6.7162E−02 | 5.1118E−01 | 2.0358E−01 | −4.7040E−03 | 6.9932E−04 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f [mm] | 2.87 | (R5 + R6)/(R5 − R6) | −0.39 |
|---|---|---|---|
| Fno | 2.18 | |(R7 − R8)/(R7 + R8)| | 0.04 |
| HFOV [Deg.] | 38.2 | |f/f4| | 0.41 |
| V2/V1 | 0.41 | f/f5 | −0.88 |
| CT3/Yc31 | 0.59 | (|f/f4| + |f/f5|)/(f/f3) | 1.38 |
| (R3 + R4)/(R3 − R4) | −2.73 | | |

Embodiment 6

Figure 6A:
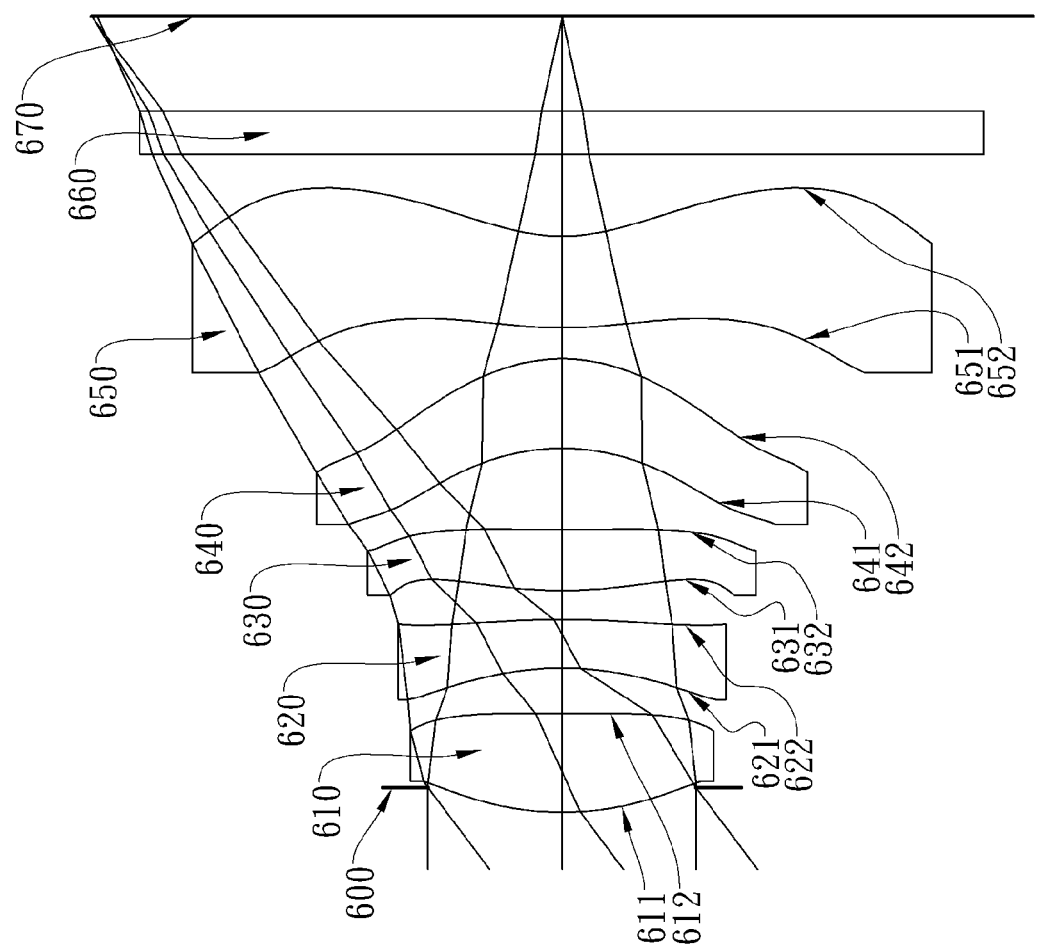
FIG. 6A shows an image capturing lens system in accordance with the sixth embodiment of the present disclosure.
Figure 6B:
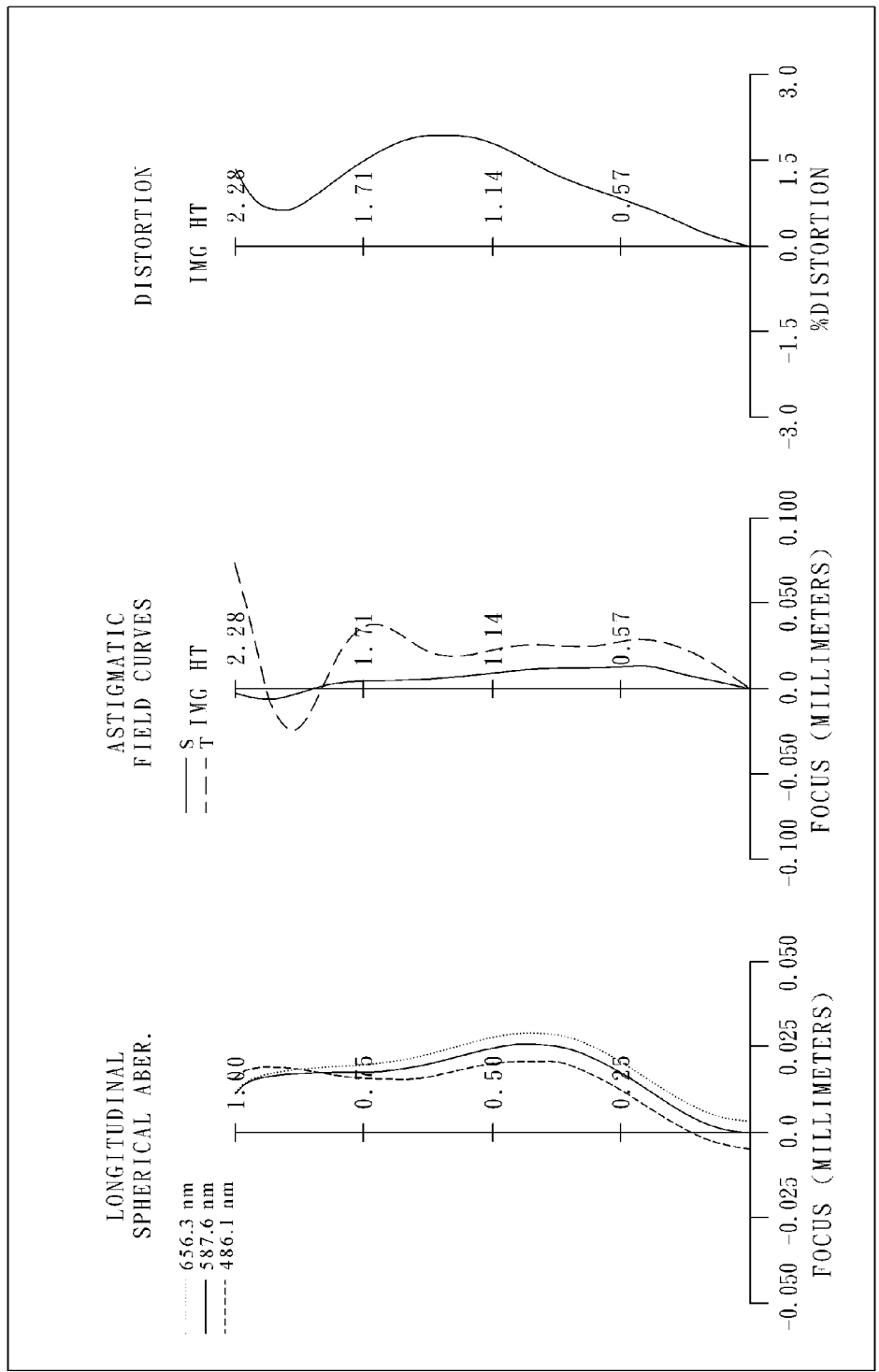
FIG. 6B shows the aberration curves of the sixth embodiment of the present disclosure.

FIG. 6A shows an image capturing lens system in accordance with the sixth embodiment of the present disclosure, and FIG. 6B shows the aberration curves of the sixth embodiment of the present disclosure. The image capturing lens system of the sixth embodiment of the present disclosure mainly comprises five lens elements, in order from an object side to an image side:

a first lens element 610 made of plastic with positive refractive power having a convex object-side surface 611 at a paraxial region and a convex image-side surface 612 at a paraxial region, the object-side and image-side surfaces 611 and 612 thereof being aspheric;

a second lens element 620 made of plastic with negative refractive power having a concave object-side surface 621 at a paraxial region and a convex image-side surface 622 at a paraxial region, the shape of the image-side surface 622 changing toward the image-side while away from the paraxial region, and the object-side and image-side surfaces 621 and 622 thereof being aspheric;

a third lens element 630 made of plastic with positive refractive power having a convex object-side surface 631 at a paraxial region and a concave image-side surface 632 at a paraxial region, the object-side and image-side surfaces 631 and 632 thereof being aspheric;

a fourth lens element 640 made of plastic with positive refractive power having a concave object-side surface 641 at a paraxial region and a convex image-side surface 642 at a paraxial region, the object-side and image-side surfaces 641 and 642 thereof being aspheric; and a fifth lens element 650 made of plastic with negative refractive power having a convex object-side surface 651 at a paraxial region and a concave image-side surface 652 at a paraxial region, the shape of the image-side surface 652 changing from concave at the paraxial region thereof to convex while away from the paraxial region thereof, and the object-side and image-side surfaces 651 and 652 thereof being aspheric;

wherein a stop 600, which is an aperture stop, is disposed between the imaged object and the first lens element 610; the image capturing lens system further comprises an IR-cut filter 660 disposed between the image-side surface 652 of the fifth lens element 650 and an image plane 670, and the IR-cut filter 660 is made of glass and has no influence on the focal length of the image capturing lens system.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

(Embodiment 6)
f = 3.00 mm, Fno = 2.30, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.121 | | | | |
| 2 | Lens 1 | 1.409 | ASP | 0.482 | Plastic | 1.544 | 55.9 | 2.58 |
| 3 | | −263.399 | ASP | 0.221 | | | | |
| 4 | Lens 2 | −1.481 | ASP | 0.236 | Plastic | 1.640 | 23.3 | −3.43 |
| 5 | | −4.847 | ASP | 0.141 | | | | |
| 6 | Lens 3 | 1.926 | ASP | 0.297 | Plastic | 1.544 | 55.9 | 4.00 |
| 7 | | 15.684 | ASP | 0.396 | | | | |
| 8 | Lens 4 | −1.055 | ASP | 0.436 | Plastic | 1.544 | 55.9 | 4.26 |
| 9 | | −0.831 | ASP | 0.151 | | | | |
| 10 | Lens 5 | 1.959 | ASP | 0.445 | Plastic | 1.535 | 56.3 | −3.19 |
| 11 | | 0.839 | ASP | 0.400 | | | | |
| 12 | IR-filter | Plano | | 0.210 | Glass | 1.517 | 64.2 | — |
| 13 | | Plano | | 0.461 | | | | |
| 14 | Image | Plano | | — | | | | |

Note:
Reference Wavelength is 587.6 nm (d-line).

TABLE 16

Aspheric Coefficients

| Surface # | 2 | 3 | 4 | 5 | 6 |
|---|---|---|---|---|---|
| k = | −1.4620E+00 | −1.0000E+00 | −2.4474E+00 | 8.5830E+00 | −1.1251E+01 |
| A4 = | 1.6844E−02 | −1.2850E−01 | 6.6204E−02 | −4.2342E−03 | −2.0944E−01 |
| A6 = | 1.7832E−01 | −2.5703E−01 | 6.1558E−02 | 5.5108E−01 | 4.2152E−01 |
| A8 = | −1.2742E+00 | 2.9556E−01 | −7.4883E−01 | −8.6756E−01 | −1.6882E+00 |

TABLE 16-continued

| Aspheric Coefficients | | | | | |
|---|---|---|---|---|---|
| A10 = | 2.9936E+00 | −1.4846E+00 | 9.7447E−01 | −1.2205E−01 | 4.1742E+00 |
| A12 = | −4.0863E+00 | 2.2040E+00 | 7.3476E−01 | 1.7537E+00 | −7.1344E+00 |
| A14 = | 1.3267E+00 | −1.1185E+00 | −7.7139E−01 | −1.2358E+00 | 4.1876E+00 |

| Surface # | 7 | 8 | 9 | 10 | 11 |
|---|---|---|---|---|---|
| k = | 2.0000E+01 | −1.3446E+00 | −3.3353E+00 | −2.6536E+01 | −5.1327E+00 |
| A4 = | −1.0855E−01 | 8.4253E−03 | −3.5031E−01 | −1.6213E−01 | −1.7633E−01 |
| A6 = | −3.5966E−01 | −4.0975E−01 | 5.5438E−01 | 4.6923E−04 | 1.3103E−01 |
| A8 = | 1.2023E+00 | 5.1366E−01 | −9.6633E−01 | 9.0880E−02 | −8.2955E−02 |
| A10 = | −1.8871E+00 | 9.5254E−01 | 1.3925E+00 | −8.8936E−02 | 3.2142E−02 |
| A12 = | 9.6586E−01 | −1.4895E+00 | −9.0395E−01 | 3.4924E−02 | −7.1546E−03 |
| A14 = | 6.0564E−02 | 5.1087E−01 | 2.0348E−01 | −4.7105E−03 | 6.9266E−04 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

| (Embodiment 6) | | | |
|---|---|---|---|
| f [mm] | 3.00 | (R5 + R6)/(R5 − R6) | −1.28 |
| Fno | 2.30 | \|(R7 − R8)/(R7 + R8)\| | 0.12 |
| HFOV [Deg.] | 36.8 | \|f/f4\| | 0.70 |
| V2/V1 | 0.42 | f/f5 | −0.94 |
| CT3/Yc31 | 0.47 | (\|f/f4\| + \|f/f5\|)/(f/f3) | 2.20 |
| (R3 + R4)/(R3 − R4) | −1.88 | | |

Embodiment 7

Figure 7A:
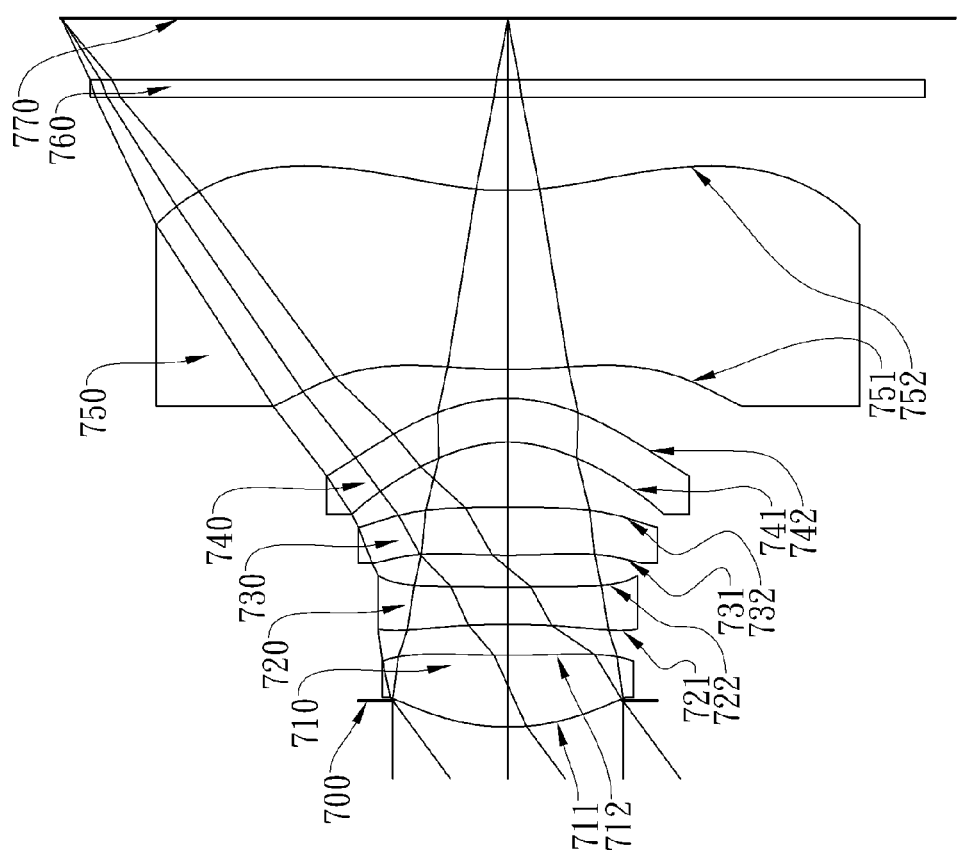
FIG. 7A shows an image capturing lens system in accordance with the seventh embodiment of the present disclosure.
Figure 7B:
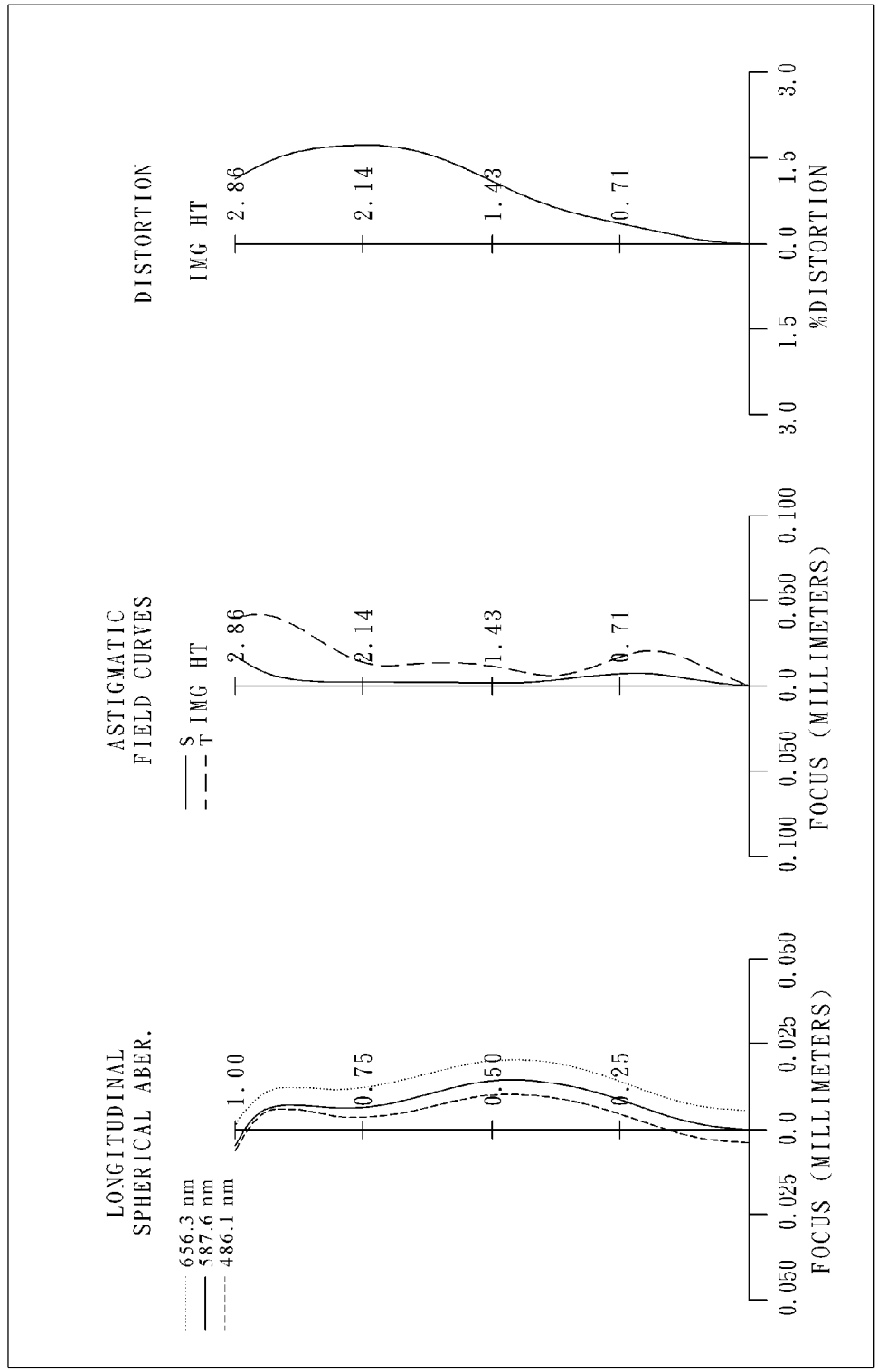
FIG. 7B shows the aberration curves of the seventh embodiment of the present disclosure.

FIG. 7A shows an image capturing lens system in accordance with the seventh embodiment of the present disclosure, and FIG. 7B shows the aberration curves of the seventh embodiment of the present disclosure. The image capturing lens system of the seventh embodiment of the present disclosure mainly comprises five lens elements, in order from an object side to an image side:

a first lens element 710 made of plastic with positive refractive power having a convex object-side surface 711 at a paraxial region and a concave image-side surface 712 at a paraxial region, the object-side and image-side surfaces 711 and 712 thereof being aspheric;

a second lens element 720 made of plastic with negative refractive power having a concave object-side surface 721 at a paraxial region and a concave image-side surface 722 at a paraxial region;

a third lens element 730 made of plastic with positive refractive power having a convex object-side surface 731 at a paraxial region and a convex image-side surface 732 at a paraxial region, the object-side and image-side surfaces 731 and 732 thereof being aspheric;

a fourth lens element 740 made of plastic with negative refractive power having a concave object-side surface 741 at a paraxial region and a convex image-side surface 742 at a paraxial region, the object-side and image-side surfaces 741 and 742 thereof being aspheric; and a fifth lens element 750 made of plastic with negative refractive power having a convex object-side surface 751 at a paraxial region and a concave image-side surface 752 at a paraxial region, the shape of the image-side surface 752 changing from concave at the paraxial region thereof to convex while away from the paraxial region thereof, and the object-side and image-side surfaces 751 and 752 thereof being aspheric;

wherein a stop 700, which is an aperture stop, is disposed between the imaged object and the first lens element 710; the image capturing lens system further comprises an IR-cut filter 760 disposed between the image-side surface 752 of the fifth lens element 750 and an image plane 770, and the IR-cut filter 760 is made of glass and has no influence on the focal length of the image capturing lens system.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

TABLE 18

(Embodiment 7)
f = 3.83 mm, Fno = 2.60, HFOV = 36.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.168 | | | | |
| 2 | Lens 1 | 1.430 ASP | 0.460 | Plastic | 1.544 | 55.9 | 3.06 |
| 3 | | 9.017 ASP | 0.197 | | | | |
| 4 | Lens 2 | −6.158 ASP | 0.240 | Plastic | 1.650 | 21.4 | −6.27 |
| 5 | | 12.242 ASP | 0.203 | | | | |
| 6 | Lens 3 | 4.553 ASP | 0.309 | Plastic | 1.544 | 55.9 | 6.22 |
| 7 | | −12.865 ASP | 0.417 | | | | |
| 8 | Lens 4 | −0.858 ASP | 0.280 | Plastic | 1.640 | 23.3 | −16.09 |
| 9 | | −1.055 ASP | 0.185 | | | | |
| 10 | Lens 5 | 3.183 ASP | 1.147 | Plastic | 1.544 | 55.9 | −12.81 |
| 11 | | 1.908 ASP | 0.600 | | | | |

TABLE 18-continued (Embodiment 7)
f = 3.83 mm, Fno = 2.60, HFOV = 36.3 deg.

| Surface # | | Curvature Radius | Thickness | Material | Index | Abbe # | Focal Length |
|---|---|---|---|---|---|---|---|
| 12 | IR-filter | Plano | 0.110 | Glass | 1.517 | 64.2 | — |
| 13 | | Plano | 0.394 | | | | |
| 14 | Image | Plano | — | | | | |

Note:
Reference Wavelength is 587.6 nm (d-line).

TABLE 19

Aspheric Coefficients

| Surface # | 2 | 3 | 4 | 5 | 6 |
|---|---|---|---|---|---|
| k = | −2.8936E−01 | 1.6878E+01 | −9.0000E+01 | 2.0000E+01 | −9.0000E+01 |
| A4 = | −9.4428E−03 | −1.0702E−01 | −1.7763E−01 | −1.7983E−01 | −1.8546E−01 |
| A6 = | −2.4978E−02 | −9.1052E−02 | 3.8920E−01 | 4.7494E−01 | −1.8670E−01 |
| A8 = | −7.7153E−02 | 6.0329E−03 | −3.0031E−01 | −2.3493E−01 | 2.2325E−01 |
| A10 = | 1.2004E−02 | −7.4998E−02 | 2.8018E−01 | 1.7529E−01 | 9.4372E−02 |
| A12 = | −1.6877E−01 | 4.0261E−02 | −1.2877E−03 | −1.7437E−03 | −2.2848E−01 |
| A14 = | 5.3287E−03 | −8.4396E−03 | −6.1579E−02 | 4.7300E−03 | 3.0548E−01 |
| A16 = | | | | | −1.5490E−01 |

| Surface # | 7 | 8 | 9 | 10 | 11 |
|---|---|---|---|---|---|
| k = | 2.0000E+01 | −2.4571E+00 | −6.0775E−01 | −4.3806E+01 | −1.0108E+01 |
| A4 = | −8.9055E−02 | 1.1286E−01 | 1.7390E−01 | −1.4602E−01 | −5.8210E−02 |
| A6 = | −1.9336E−01 | −4.1278E−01 | −1.1395E−01 | 4.5465E−02 | 1.9339E−02 |
| A8 = | 1.6067E−01 | 4.4351E−01 | 5.1313E−02 | −1.5645E−02 | −6.5404E−03 |
| A10 = | 5.1401E−02 | −1.5593E−01 | 5.4032E−02 | 2.7496E−03 | 1.3437E−03 |
| A12 = | −2.0814E−02 | −2.1719E−02 | −2.4960E−02 | 8.6615E−04 | −1.5334E−04 |
| A14 = | −5.4484E−03 | 6.8481E−04 | −2.6943E−02 | −5.5623E−05 | 7.1688E−06 |
| A16 = | | −3.3503E−03 | 1.5227E−02 | −5.2443E−05 | |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f [mm] | 3.83 | (R5 + R6)/(R5 − R6) | −0.48 |
|---|---|---|---|
| Fno | 2.60 | |(R7 − R8)/(R7 + R8)| | 0.10 |
| HFOV [Deg.] | 36.3 | |f/f4| | 0.24 |
| V2/V1 | 0.38 | f/f5 | −0.30 |
| CT3/Yc31 | 0.72 | (|f/f4| + |f/f5|)/(f/f3) | 0.87 |
| (R3 + R4)/(R3 − R4) | −0.33 | | |

Embodiment 8

Figure 8A:
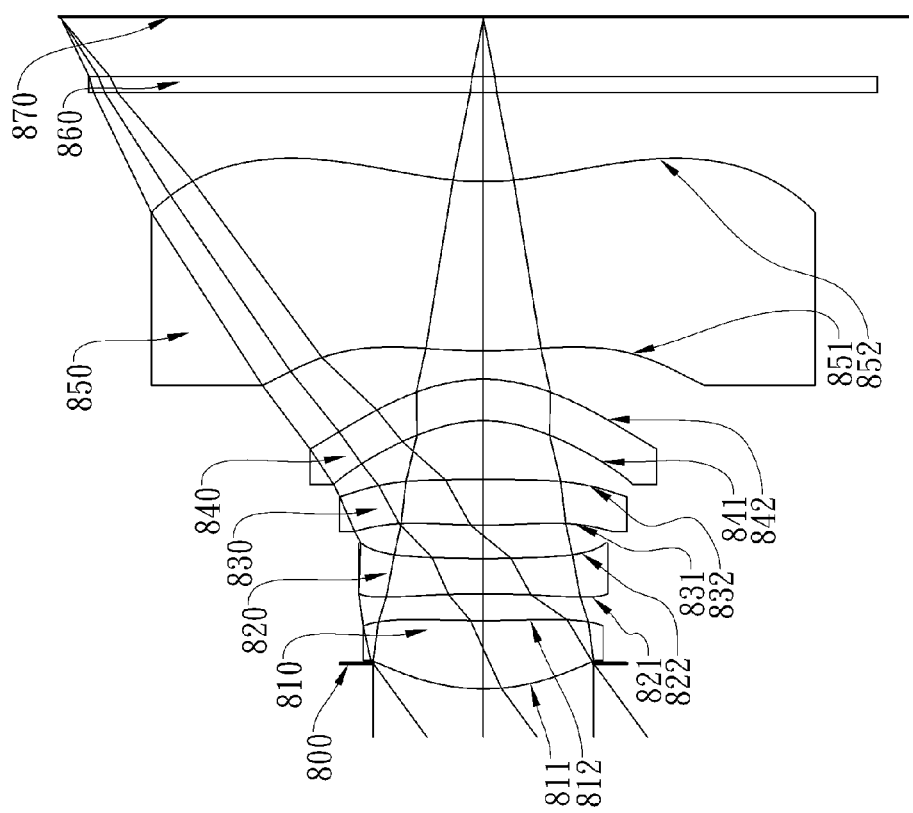
FIG. 8A shows an image capturing lens system in accordance with the eighth embodiment of the present disclosure.
Figure 8B:
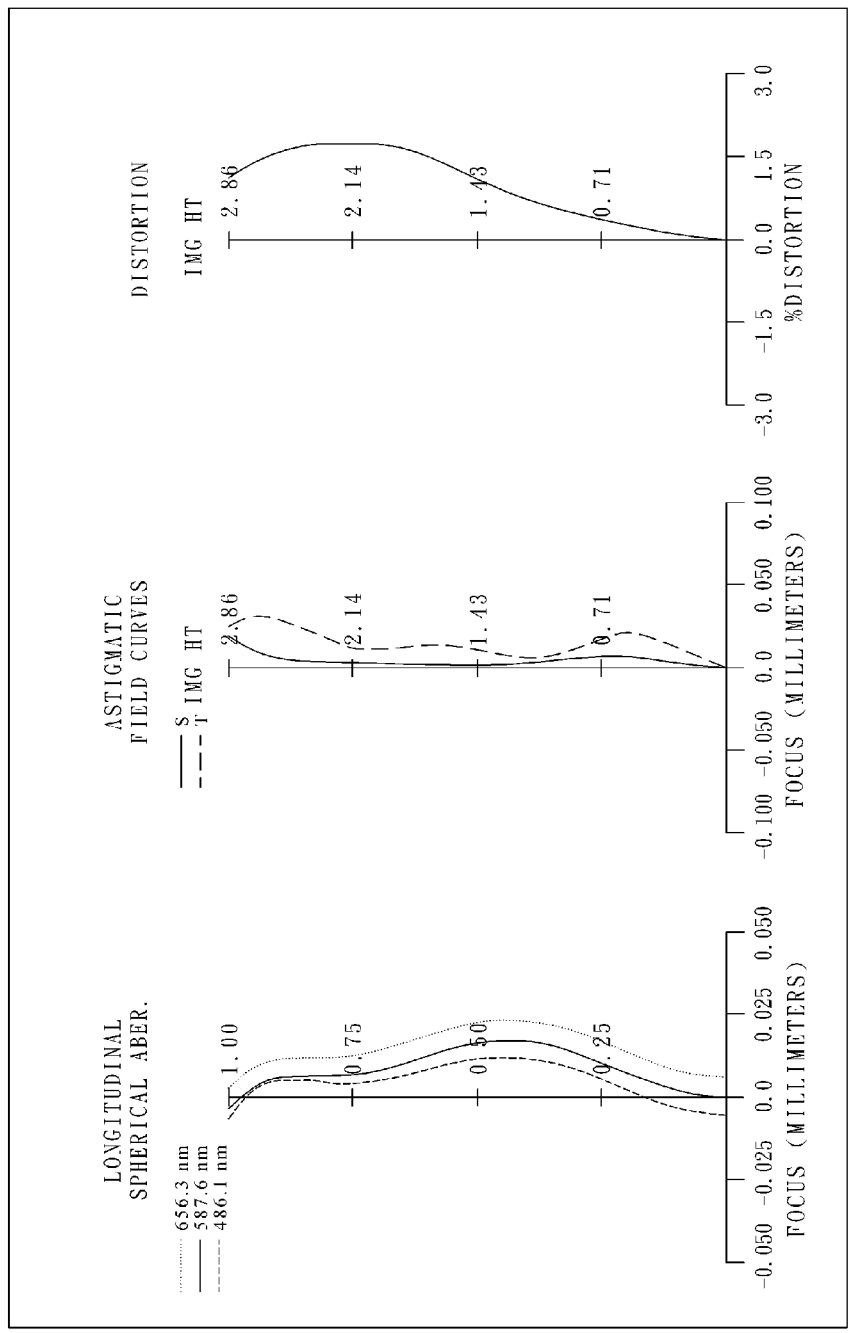
FIG. 8B shows the aberration curves of the eighth embodiment of the present disclosure.

FIG. 8A shows an image capturing lens system in accordance with the eighth embodiment of the present disclosure, and FIG. 8B shows the aberration curves of the eighth embodiment of the present disclosure. The image capturing lens system of the eighth embodiment of the present disclosure mainly comprises five lens elements, in order from an object side to an image side:

a first lens element 810 made of plastic with positive refractive power having a convex object-side surface 811 at a paraxial region and a concave image-side surface 812 at a paraxial region, the object-side and image-side surfaces 811 and 812 thereof being aspheric;

a second lens element 820 made of plastic with negative refractive power having a concave object-side surface 821 at a paraxial region and a concave image-side surface 822 at a paraxial region;

a third lens element 830 made of plastic with positive refractive power having a convex object-side surface 831 at a paraxial region and a convex image-side surface 832 at a paraxial region, the object-side and image-side surfaces 831 and 832 thereof being aspheric;

a fourth lens element 840 made of plastic with negative refractive power having a concave object-side surface 841 at a paraxial region and a convex image-side surface 842 at a paraxial region, the object-side and image-side surfaces 841 and 842 thereof being aspheric; and a fifth lens element 850 made of plastic with negative refractive power having a convex object-side surface 851 at a paraxial region and a concave image-side surface 852 at a paraxial region, the shape of the image-side surface 852 changing from concave at the paraxial region thereof to convex while away from the paraxial region thereof, and the object-side and image-side surfaces 851 and 852 thereof being aspheric;

wherein a stop 800, an aperture stop, is disposed between the imaged object and the first lens element 810; the image capturing lens system further comprises an IR-cut filter 860 disposed between the image-side surface 852 of the fifth lens element 850 and an image plane 870, and the IR-cut filter 860 is made of glass and has no influence on the focal length of the image capturing lens system.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

TABLE 21

(Embodiment 8)
f = 3.87 mm, Fno = 2.60, HFOV = 36.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.172 | | | | |
| 2 | Lens 1 | 1.417 ASP | 0.461 | Plastic | 1.544 | 55.9 | 3.09 |
| 3 | | 7.959 ASP | 0.179 | | | | |
| 4 | Lens 2 | −11.654 ASP | 0.240 | Plastic | 1.650 | 21.4 | −6.50 |
| 5 | | 6.682 ASP | 0.225 | | | | |
| 6 | Lens 3 | 4.104 ASP | 0.308 | Plastic | 1.544 | 55.9 | 6.81 |
| 7 | | −36.937 ASP | 0.398 | | | | |
| 8 | Lens 4 | −0.913 ASP | 0.280 | Plastic | 1.640 | 23.3 | −17.75 |
| 9 | | −1.111 ASP | 0.191 | | | | |
| 10 | Lens 5 | 3.192 ASP | 1.144 | Plastic | 1.544 | 55.9 | −12.81 |
| 11 | | 1.913 ASP | 0.600 | | | | |
| 12 | IR-filter | Plano | 0.110 | Plastic | 1.514 | 56.5 | — |
| 13 | | Plano | 0.405 | | | | |
| 14 | Image | Plano | — | | | | |

Note:
Reference Wavelength is 587.6 nm (d-line).

TABLE 22

| Aspheric Coefficients | | | | | |
|---|---|---|---|---|---|
| Surface # | 2 | 3 | 4 | 5 | 6 |
| k = | −3.1319E−01 | −1.0613E+01 | −7.0253E+01 | 1.6474E+01 | −7.0193E+01 |
| A4 = | −1.0872E−02 | −1.1380E−01 | −1.5648E−01 | −1.8076E−01 | −1.5993E−01 |
| A6 = | −1.7654E−02 | −8.2580E−02 | 3.9632E−01 | 5.2734E−01 | −1.8602E−01 |
| A8 = | −1.0489E−01 | 2.7205E−02 | −3.0200E−01 | −3.0963E−01 | 2.3915E−01 |
| A10 = | 4.1330E−02 | −9.3063E−02 | 2.7603E−01 | 2.2902E−01 | 2.7271E−02 |
| A12 = | −1.7054E−01 | 4.1835E−02 | −2.4362E−03 | −3.3467E−03 | −2.2830E−01 |
| A14 = | 4.4995E−03 | −2.6189E−03 | −6.3286E−02 | 2.9986E−03 | 3.0665E−01 |
| A16 = | | | | | −1.5454E−01 |
| Surface # | 7 | 8 | 9 | 10 | 11 |
| k = | −8.8294E+01 | −2.7177E+00 | −5.9606E−01 | −4.4582E+01 | −1.0179E+01 |
| A4 = | −8.1641E−02 | 1.2769E−01 | 1.7389E−01 | −1.4602E−01 | −5.8210E−02 |
| A6 = | −1.9529E−01 | −4.0598E−01 | −1.1521E−01 | 4.5465E−02 | 1.9339E−02 |
| A8 = | 1.8735E−01 | 4.3522E−01 | 4.9008E−02 | −1.5645E−02 | −6.5404E−03 |
| A10 = | 4.1808E−03 | −1.5476E−01 | 5.4943E−02 | 2.7496E−03 | 1.3437E−03 |
| A12 = | −2.1235E−02 | −2.2101E−02 | −2.5561E−02 | 8.6615E−04 | −1.5334E−04 |
| A14 = | −6.1617E−03 | 1.7729E−04 | −2.7211E−02 | −5.5623E−05 | 7.1688E−06 |
| A16 = | | −3.8484E−03 | 1.4857E−02 | −5.2443E−05 | |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f [mm] | 3.87 | (R5 + R6)/(R5 − R6) | −0.80 |
|---|---|---|---|
| Fno | 2.60 | |(R7 − R8)/(R7 + R8)| | 0.10 |
| HFOV [Deg.] | 36.1 | |f/f4| | 0.22 |
| V2/V1 | 0.38 | f/f5 | −0.30 |

TABLE 23-continued (Embodiment 8)

| CT3/Yc31 | 0.66 | (|f/f4| + |f/f5|)/(f/f3) | 0.92 |
|---|---|---|---|
| (R3 + R4)/(R3 − R4) | 0.27 | | |

Embodiment 9

Figure 9A:
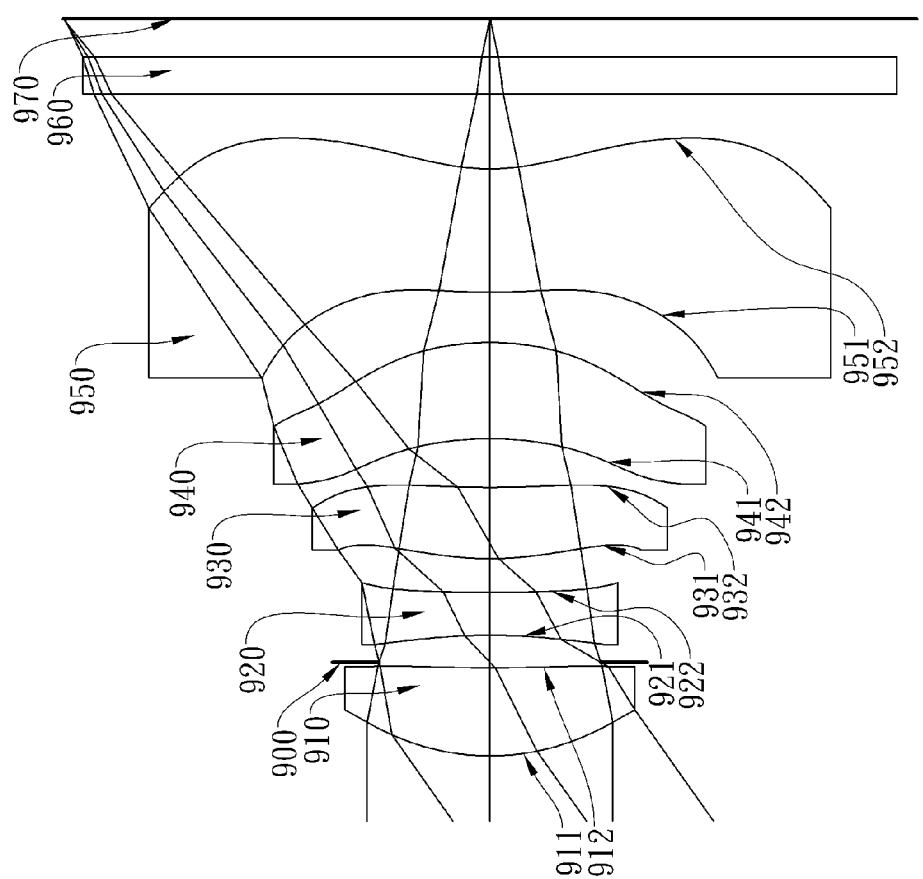
FIG. 9A shows an image capturing lens system in accordance with the ninth embodiment of the present disclosure.
Figure 9B:
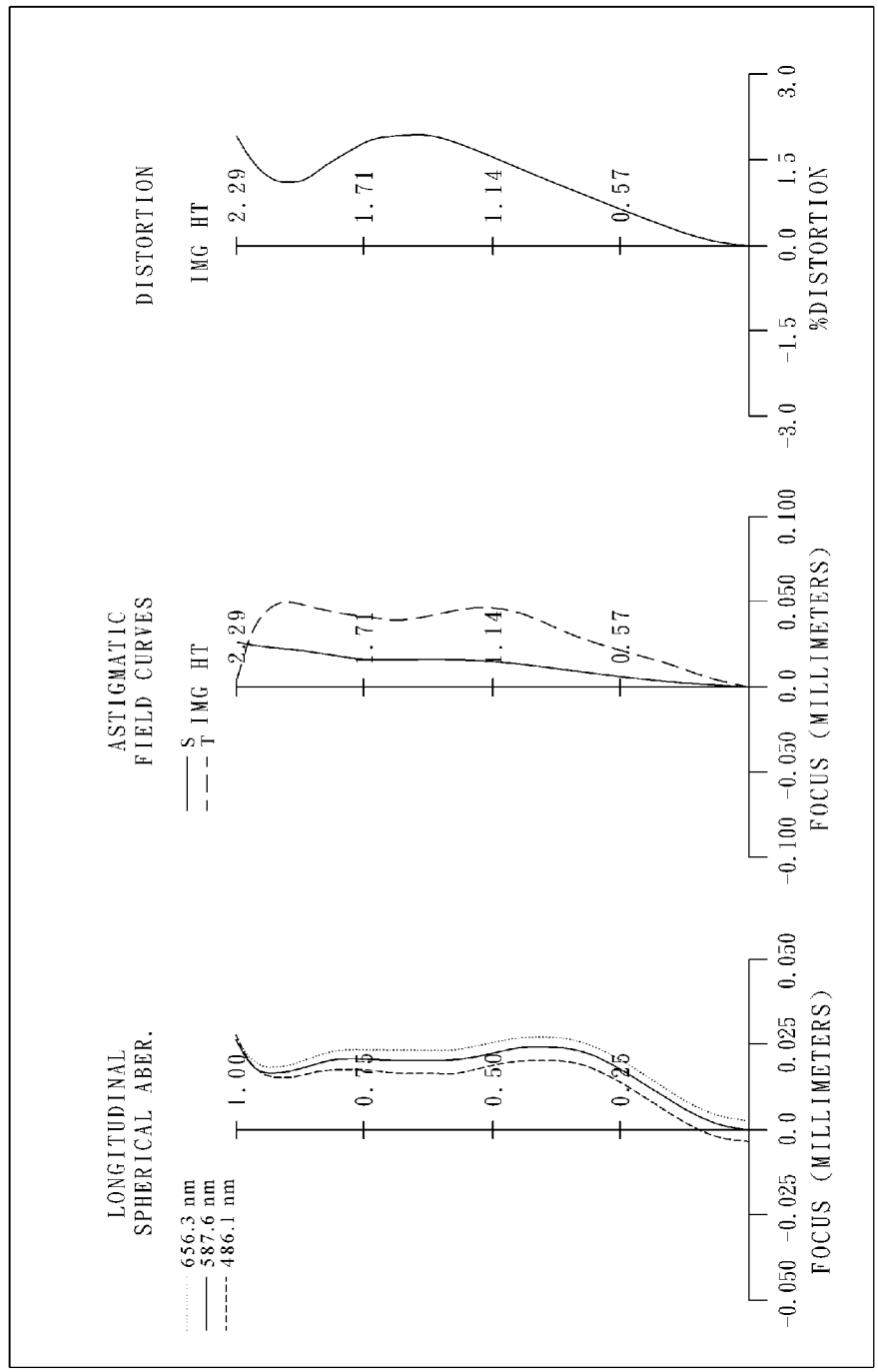
FIG. 9B shows the aberration curves of the ninth embodiment of the present disclosure.

FIG. 9A shows an image capturing lens system in accordance with the ninth embodiment of the present disclosure, and FIG. 9B shows the aberration curves of the ninth embodiment of the present disclosure. The image capturing lens system of the ninth embodiment of the present disclosure mainly comprises five lens elements, in order from an object side to an image side:

a first lens element 910 made of plastic with positive refractive power having a convex object-side surface 911 at a paraxial region and a concave image-side surface 912 at a paraxial region, the object-side and image-side surfaces 911 and 912 thereof being aspheric;

a second lens element 920 made of plastic with negative refractive power having a concave object-side surface 921 at a paraxial region and a concave image-side surface 922 at a paraxial region;

a third lens element 930 made of plastic with positive refractive power having a convex object-side surface 931 at a paraxial region and a concave image-side surface 932 at a paraxial region, the object-side and image-side surfaces 931 and 932 thereof being aspheric;

a fourth lens element 940 made of plastic with positive refractive power having a concave object-side surface 941 at a paraxial region and a convex image-side surface 942 at a paraxial region, the object-side and image-side surfaces 941 and 942 thereof being aspheric; and a fifth lens element 950 made of plastic with negative refractive power having a convex object-side surface 951 at a paraxial region and a concave image-side surface 952 at a paraxial region, the shape of the image-side surface 952 changing from concave at the paraxial region thereof to convex while away from the paraxial region thereof, and the object-side and image-side surfaces 951 and 952 thereof being aspheric;

wherein a stop 900, which is an aperture stop, is disposed between the first lens element 910 and the second lens element 920; the image capturing lens system further comprises an IR-cut filter 960 disposed between the image-side surface 952 of the fifth lens element 950 and an image plane 970, and the IR-cut filter 960 is made of glass and has no influence on the focal length of the image capturing lens system.

The detailed optical data of the ninth embodiment is shown in TABLE 24, and the aspheric surface data is shown in TABLE 25, wherein the units of the curvature radius, the thickness and the focal length are expressed in mm, and HFOV is half of the maximal field of view.

TABLE 24

(Embodiment 9)
f = 3.16 mm, Fno = 2.40, HFOV = 35.2 deg.

| Surface # | | Curvature Radius | Thickness | Material | Index | Abbe # | Focal Length |
|---|---|---|---|---|---|---|---|
| 0 | Object | Plano | | Infinity | | | |
| 1 | Lens 1 | 1.263 ASP | 0.472 | Plastic | 1.544 | 55.9 | 2.64 |
| 2 | | 9.030 ASP | 0.030 | | | | |
| 3 | Ape. Stop | Plano | 0.145 | | | | |
| 4 | Lens 2 | −3.056 ASP | 0.230 | Plastic | 1.640 | 23.3 | −3.60 |
| 5 | | 9.677 ASP | 0.181 | | | | |
| 6 | Lens 3 | 1.677 ASP | 0.382 | Plastic | 1.544 | 55.9 | 4.38 |
| 7 | | 5.193 ASP | 0.261 | | | | |
| 8 | Lens 4 | −1.832 ASP | 0.516 | Plastic | 1.544 | 55.9 | 11.75 |
| 9 | | −1.565 ASP | 0.269 | | | | |
| 10 | Lens 5 | 2.705 ASP | 0.663 | Plastic | 1.535 | 56.3 | −4.33 |
| 11 | | 1.141 ASP | 0.400 | | | | |
| 12 | IR-filter | Plano | 0.200 | Glass | 1.517 | 64.2 | — |
| 13 | | Plano | 0.204 | | | | |
| 14 | Image | Plano | — | | | | |

Note:
Reference Wavelength is 587.6 nm (d-line).

TABLE 25

Aspheric Coefficients

| Surface # | 1 | 2 | 4 | 5 | 6 |
|---|---|---|---|---|---|
| k = | −1.6249E+00 | −1.0000E+00 | −2.7199E+00 | −5.0000E+01 | −8.7578E+00 |
| A4 = | 6.1890E−02 | −7.3496E−02 | 1.9066E−03 | −1.1015E−01 | −1.8442E−01 |
| A6 = | 3.3571E−01 | 8.5074E−02 | 6.5294E−01 | 1.0970E+00 | 4.4257E−01 |
| A8 = | −1.5615E+00 | −9.1098E−02 | −1.6689E+00 | −1.8651E+00 | −1.8647E+00 |
| A10 = | 3.6061E+00 | −1.3237E+00 | 1.1347E+00 | 7.9577E−01 | 4.5320E+00 |
| A12 = | −4.0862E+00 | 2.1859E+00 | 7.2879E−01 | 1.7509E+00 | −7.1322E+00 |
| A14 = | 1.3279E+00 | −1.1136E+00 | −7.6650E−01 | −1.2268E+00 | 4.1920E+00 |

| Surface # | 7 | 8 | 9 | 10 | 11 |
|---|---|---|---|---|---|
| k = | 1.0000E+00 | −6.4526E−01 | −2.7934E+00 | −4.4600E+01 | −5.2449E+00 |
| A4 = | −1.2019E−01 | −3.3965E−02 | −3.8391E−01 | −4.7949E−01 | −2.2209E−01 |
| A6 = | −4.4022E−01 | −4.4018E−01 | 5.6501E−01 | 2.2858E−01 | 1.6572E−01 |
| A8 = | 1.0747E+00 | 5.1083E−01 | −9.5610E−01 | 6.3241E−02 | −9.1342E−02 |
| A10 = | −1.6349E+00 | 9.6610E−01 | 1.3868E+00 | −1.1795E−01 | 3.1776E−02 |
| A12 = | 1.1338E+00 | −1.4760E+00 | −9.0590E−01 | 2.3728E−02 | −6.6836E−03 |
| A14 = | −2.5054E−01 | 5.1416E−01 | 2.0253E−01 | 7.9777E−04 | 6.1920E−04 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| | | | |
|---|---|---|---|
| f [mm] | 3.16 | (R5 + R6)/(R5 − R6) | −1.95 |
| Fno | 2.40 | |(R7 − R8)/(R7 + R8)| | 0.08 |
| HFOV [Deg.] | 35.2 | |f/f4| | 0.27 |
| V2/V1 | 0.42 | f/f5 | −0.73 |
| CT3/Yc31 | 0.57 | (|f/f4| + |f/f5|)/(f/f3) | 1.39 |
| (R3 + R4)/(R3 − R4) | −0.52 | | |

Embodiment 10

Figure 10A:
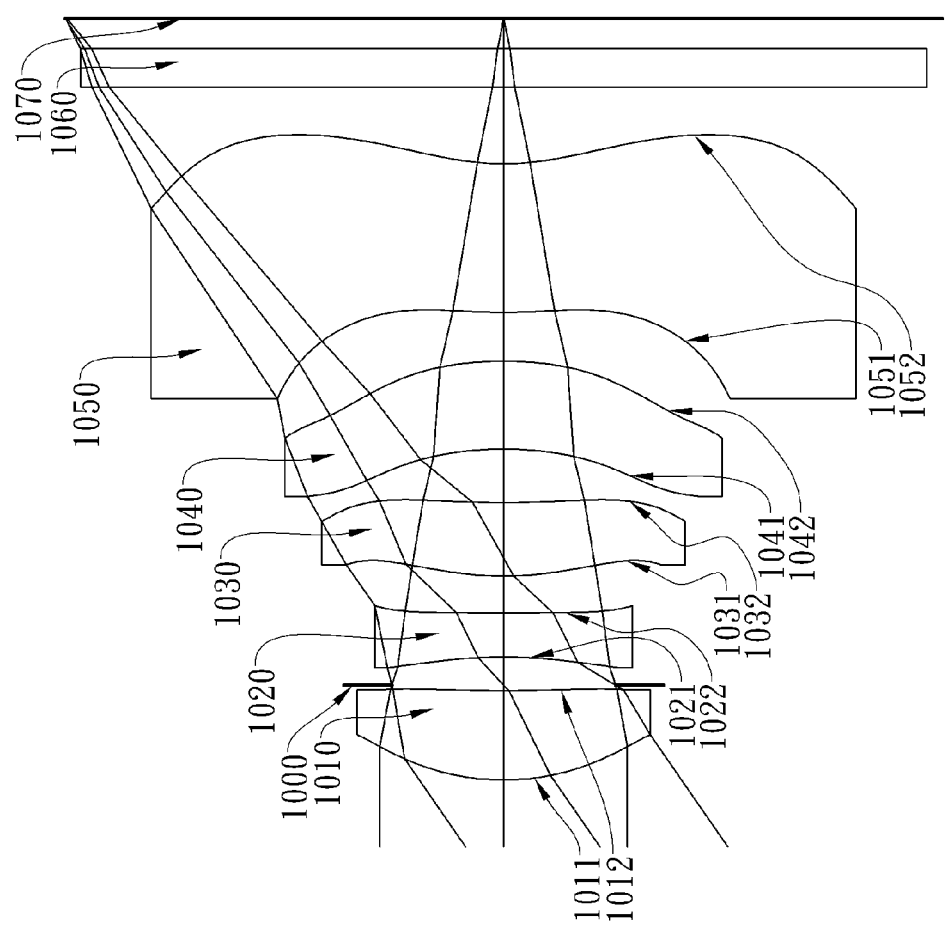
FIG. 10A shows an image capturing lens system in accordance with the tenth embodiment of the present disclosure.
Figure 10B:
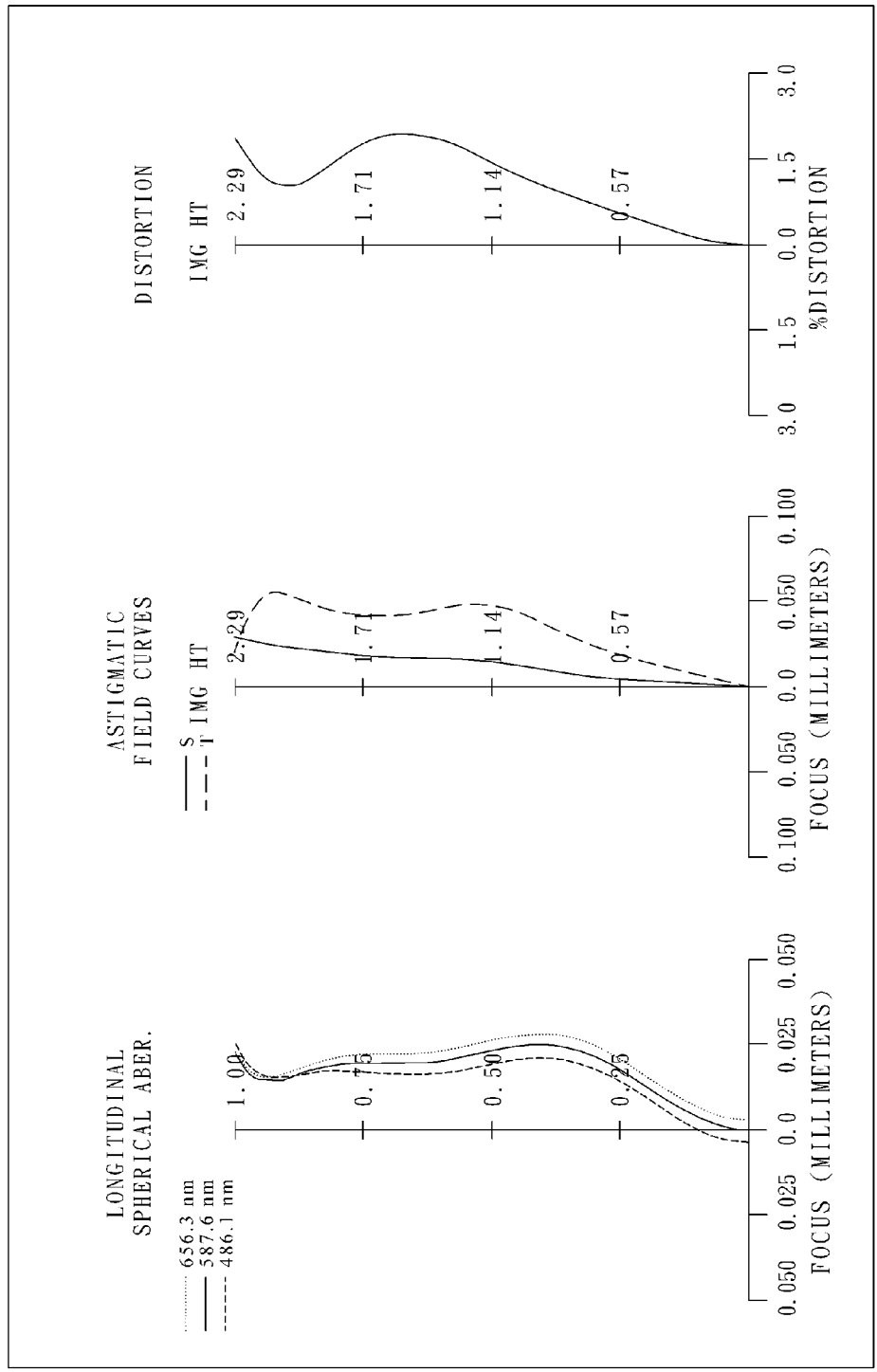
FIG. 10B shows the aberration curves of the tenth embodiment of the present disclosure.

FIG. 10A shows an image capturing lens system in accordance with the tenth embodiment of the present disclosure, and FIG. 10B shows the aberration curves of the tenth embodiment of the present disclosure. The image capturing lens system of the tenth embodiment of the present disclosure mainly comprises five lens elements, in order from an object side to an image side:

a first lens element 1010 made of plastic with positive refractive power having a convex object-side surface 1011 at a paraxial region and a concave image-side surface 1012 at a paraxial region, the object-side and image-side surfaces 1011 and 1012 thereof being aspheric;

a second lens element 1020 made of plastic with negative refractive power having a concave object-side surface 1021 at a paraxial region and a concave image-side surface 1022 at a paraxial region;

a third lens element 1030 made of plastic with positive refractive power having a convex object-side surface 1031 at a paraxial region and a concave image-side surface 1032 at a paraxial region, the object-side and image-side surfaces 1031 and 1032 thereof being aspheric;

a fourth lens element 1040 made of plastic with negative refractive power having a concave object-side surface 1041 at a paraxial region and a convex image-side surface 1042 at a paraxial region, the object-side and image-side surfaces 1041 and 1042 thereof being aspheric; and a fifth lens element 1050 made of plastic with negative refractive power having a convex object-side surface 1051 at a paraxial region and a concave image-side surface 1052 at a paraxial region, the shape of the image-side surface 1052 changing from concave at the paraxial region thereof to convex while away from the paraxial region thereof, and the object-side and image-side surfaces 1051 and 1052 thereof being aspheric;

wherein a stop 1000, which is an aperture stop, is disposed between the first lens element 1010 and the second lens element 1020; the image capturing lens system further comprises an IR-cut filter 1060 disposed between the image-side surface 1052 of the fifth lens element 1050 and an image plane 1070, and the IR-cut filter 1060 is made of glass and has no influence on the focal length of the image capturing lens system.

The detailed optical data of the ninth embodiment is shown in TABLE 27, and the aspheric surface data is shown in TABLE 28, wherein the units of the curvature radius, the thickness and the focal length are expressed in mm, and HFOV is half of the maximal field of view.

TABLE 27

(Embodiment 10)
f = 3.23 mm, Fno = 2.50, HFOV = 34.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.242 | ASP | 0.465 | Plastic | 1.544 | 55.9 | 2.63 |
| 2 | | 8.224 | ASP | 0.030 | | | | |
| 3 | Ape. Stop | Plano | | 0.146 | | | | |
| 4 | Lens 2 | −2.607 | ASP | 0.230 | Plastic | 1.640 | 23.3 | −3.72 |
| 5 | | 28.472 | ASP | 0.193 | | | | |
| 6 | Lens 3 | 1.594 | ASP | 0.383 | Plastic | 1.544 | 55.9 | 4.20 |
| 7 | | 4.834 | ASP | 0.280 | | | | |
| 8 | Lens 4 | −1.815 | ASP | 0.458 | Plastic | 1.544 | 55.9 | −82.54 |
| 9 | | −2.060 | ASP | 0.255 | | | | |
| 10 | Lens 5 | 2.752 | ASP | 0.776 | Plastic | 1.535 | 56.3 | −5.90 |
| 11 | | 1.325 | ASP | 0.400 | | | | |
| 12 | IR-filter | Plano | | 0.200 | Glass | 1.517 | 64.2 | — |
| 13 | | Plano | | 0.156 | | | | |
| 14 | Image | Plano | | — | | | | |

Note:
Reference Wavelength is 587.6 nm (d-line).

TABLE 28

Aspheric Coefficients

| Surface # | 1 | 2 | 4 | 5 | 6 |
|---|---|---|---|---|---|
| k = | −1.6404E+00 | −1.0000E+00 | −5.4737E−01 | −2.7564E+00 | −8.0375E+00 |
| A4 = | 6.1185E−02 | −9.6201E−02 | 7.6749E−03 | −1.2412E−01 | −1.7291E−01 |
| A6 = | 3.3692E−01 | 5.7500E−02 | 6.5308E−01 | 1.1582E+00 | 4.3501E−01 |
| A8 = | −1.5793E+00 | −1.1216E−01 | −1.4758E+00 | −1.8586E+00 | −1.8865E+00 |
| A10 = | 3.5503E+00 | −1.2165E+00 | 1.0215E+00 | 8.9098E−01 | 4.5985E+00 |

TABLE 28-continued

| Aspheric Coefficients | | | | |
|---|---|---|---|---|
| A12 = −4.0862E+00 | 2.1859E+00 | 7.2879E−01 | 1.7509E+00 | −7.1322E+00 |
| A14 = 1.3279E+00 | −1.1136E+00 | −7.6650E−01 | −1.2268E+00 | 4.1920E+00 |

| Surface # | 7 | 8 | 9 | 10 | 11 |
|---|---|---|---|---|---|
| k = | 1.0000E+00 | −6.1249E−01 | −8.2024E−01 | −4.3610E+01 | −4.8186E+00 |
| A4 = | −1.1241E−01 | −3.3807E−02 | −3.8823E−01 | −4.5796E−01 | −2.2019E−01 |
| A6 = | −4.4549E−01 | −4.4535E−01 | 5.8986E−01 | 1.7899E−01 | 1.6443E−01 |
| A8 = | 1.0626E+00 | 5.1335E−01 | −9.5830E−01 | 7.8678E−02 | −9.1522E−02 |
| A10 = | −1.6281E+00 | 9.6866E−01 | 1.3810E+00 | −1.1402E−01 | 3.1905E−02 |
| A12 = | 1.1385E+00 | −1.4748E+00 | −9.0820E−01 | 1.9956E−02 | −6.6599E−03 |
| A14 = | −2.4882E−01 | 5.1190E−01 | 2.0261E−01 | −1.7193E−03 | 6.1067E−04 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 29.

TABLE 29

| (Embodiment 10) | | | |
|---|---|---|---|
| f [mm] | 3.23 | (R5 + R6)/(R5 − R6) | −1.98 |
| Fno | 2.50 | |(R7 − R8)/(R7 + R8)| | 0.06 |
| HFOV [Deg.] | 34.6 | |f/f4| | 0.04 |
| V2/V1 | 0.42 | f/f5 | −0.55 |
| CT3/Yc31 | 0.56 | (|f/f4| + |f/f5|)/(f/f3) | 0.76 |
| (R3 + R4)/(R3 − R4) | −0.83 | | |

It is to be noted that TABLES 1-29 show different data of the different embodiments; however, the data of the different embodiments are obtained from experiments. Therefore, any image capturing lens system of the same structure is considered to be within the scope of the present disclosure even if it uses different data. The embodiments depicted above and the appended drawings are exemplary and are not intended to limit the scope of the present disclosure.

What is claimed is:

1. An image capturing lens system comprising, in order from an object side to an image side:
   a first lens element with positive refractive power having a convex object-side surface at a paraxial region;
   a second lens element with negative refractive power having a concave object-side surface at a paraxial region;
   a third lens element with positive refractive power having a convex object-side surface at a paraxial region;
   a fourth lens element with negative refractive power having a concave object-side surface at a paraxial region and a convex image-side surface at a paraxial region; and
   a fifth lens element with refractive power having a concave image-side surface at a paraxial region, the shape of the image-side surface changing from concave at the paraxial region thereof to convex while away from the paraxial region thereof, both of the object-side and image-side surfaces being aspheric;
   wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, and they satisfy the following relations:

$-3.5 < (R3+R4)/(R3-R4) < -0.2$; and $-3.5 < (R5+R6)/(R5-R6) < -0.3$.

2. The image capturing lens system according to claim 1, wherein a curvature radius of the object-side surface of the fourth lens element is R7, a curvature radius of the image-side surface of the fourth lens element is R8, and they satisfy the following relation:

$|(R7-R8)/(R7+R8)| < 0.3$.

3. The image capturing lens system according to claim 2, wherein a focal length of the image capturing lens system is f, a focal length of the fifth lens element is f5, and they satisfy the following relation:

$-1.0 \leq f/f5 < 0.50$.

4. The image capturing lens system according to claim 2, wherein an Abbe number of the second lens element is V2, an Abbe number of the first lens element is V1, and they satisfy the following relation:

$0.30 < V2/V1 < 0.60$.

5. The image capturing lens system according to claim 1, wherein the curvature radius of the object-side surface of the second lens element is R3, the curvature radius of the image-side surface of the second lens element is R4, and they satisfy the following relation:

$-3.5 < (R3+R4)/(R3-R4) < -0.5$.

6. The image capturing lens system according to claim 1, wherein the curvature radius of the object-side surface of the third lens element is R5, the curvature radius of the image-side surface of the third lens element is R6, and they satisfy the following relation:

$-3.5 < (R5+R6)/(R5-R6) < -0.6$.

7. The image capturing lens system according to claim 1, the second lens element has a convex image-side surface at a paraxial region, and the shape of the image-side surface changes toward the image-side at an outermost region of the image capturing lens system.

8. The image capturing lens system according to claim 1, wherein a central thickness of the third lens element is CT3, a vertical distance with respect to an optical axis between a non-axial critical point on the object-side surface of the third lens element and the optical axis is Yc31, and they satisfy the following relation:

$0.2 < CT3/Yc31 < 1.0$.

9. The image capturing lens system according to claim 1, a focal length of the image capturing lens system is f, a focal length of the fourth lens element is f4, a focal length of the fifth lens element is f5, a focal length of the third lens element is f3, and they satisfy the following relation:

$0 < (|f/f4| + |f/f5|)/(f/f3) < 1.0$.

10. An image capturing lens system comprising, in order from an object side to an image side:
- a first lens element with positive refractive power having a convex object-side surface at a paraxial region;
- a second lens element with negative refractive power having a concave object-side surface at a paraxial region;
- a third lens element with positive refractive power having a convex object-side surface at a paraxial region;
- a fourth lens element with refractive power having a concave object-side surface at a paraxial region and a convex image-side surface at a paraxial region; and
- a fifth lens element with refractive power having a concave image-side surface at a paraxial region, the shape of the image-side surface changing from concave at the paraxial region thereof to convex while away from the paraxial region thereof, both of the object-side and image-side surfaces being aspheric;
- wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, a focal length of the image capturing lens system is f, a focal length of the fourth lens element is f4, a focal length of the fifth lens element is f5, and they satisfy the following relations:

$$-3.5<(R3+R4)/(R3-R4)<-0.2;$$

$$-3.5<(R5+R6)/(R5-R6)<-0.3;$$

$$0<|f/f4|<0.8; \text{ and}$$

$$-1.0 \leq f/f5 < 0.50.$$

11. The image capturing lens system according to claim 10, wherein the curvature radius of the object-side surface of the second lens element is R3, the curvature radius of the image-side surface of the second lens element is R4, and they satisfy the following relation:

$$-3.5<(R3+R4)/(R3-R4)<-0.5.$$

12. The image capturing lens system according to claim 11, wherein the curvature radius of the object-side surface of the second lens element is R3, the curvature radius of the image-side surface of the second lens element is R4, and they satisfy the following relation:

$$-3.5<(R3+R4)/(R3-R4)<-1.0.$$

13. The image capturing lens system according to claim 11, the focal length of the image capturing lens system is f, the focal length of the fourth lens element is f4, the focal length of the fifth lens element is f5, a focal length of the third lens element is f3, and they satisfy the following relation:

$$0<(|f/f4|+|f/f5|)/(f/f3)<1.8.$$

14. The image capturing lens system according to claim 10, wherein a central thickness of the third lens element is CT3, a vertical distance with respect to an optical axis between a non-axial critical point on the object-side surface of the third lens element and the optical axis is Yc31, and they satisfy the following relation:

$$0.2<CT3/Yc31<1.0.$$

15. The image capturing lens system according to claim 10, the second lens element has a convex image-side surface at a paraxial region, and the shape of the image-side surface changes toward the image-side at an outermost region of the image capturing lens system.

16. An image capturing lens system comprising, in order from an object side to an image side:
- a first lens element with positive refractive power having a convex object-side surface at a paraxial region;
- a second lens element with negative refractive power having a concave object-side surface at a paraxial region;
- a third lens element with positive refractive power having a convex object-side surface at a paraxial region;
- a fourth lens element with negative refractive power having a concave object-side surface at a paraxial region and a convex image-side surface at a paraxial region; and
- a fifth lens element with refractive power having a convex object-side surface at a paraxial region and a concave image-side surface at a paraxial region, the shape of the image-side surface changing from concave at the paraxial region thereof to convex while away from the paraxial region thereof, both of the object-side and image-side surfaces being aspheric;
- wherein a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, and they satisfy the following relations:

$$-3.5<(R3+R4)/(R3-R4)<0.6; \text{ and}$$

$$-3.5<(R5+R6)/(R5-R6)<-0.6.$$

17. The image capturing lens system according to claim 16, wherein an Abbe number of the second lens element is V2, an Abbe number of the first lens element is V1, and they satisfy the following relation:

$$0.30<V2/V1<0.60.$$

18. The image capturing lens system according to claim 16, wherein a curvature radius of the object-side surface of the fourth lens element is R7, a curvature radius of the image-side surface of the fourth lens element is R8, and they satisfy the following relation:

$$|(R7-R8)/(R7+R8)|<0.3.$$

19. The image capturing lens system according to claim 16, a focal length of the image capturing lens system is f, a focal length of the fourth lens element is f4, a focal length of the fifth lens element is f5, a focal length of the third lens element is f3, and they satisfy the following relation:

$$0<(|f/f4|+|f/f5|)/(f/f3)<1.0.$$

20. The image capturing lens system according to claim 16, wherein a central thickness of the third lens element is CT3, a vertical distance with respect to an optical axis between a non-axial critical point on the object-side surface of the third lens element and the optical axis is Yc31, and they satisfy the following relation:

$$0.2<CT3/Yc31<1.0.$$

21. The image capturing lens system according to claim 16, wherein a focal length of the image capturing lens system is f, a focal length of the fourth lens element is f4, a focal length of the fifth lens element is f5, and they satisfy the following relations:

$$0<|f/f4|<0.8; \text{ and}$$

$$-1.0 \leq f/f5 < 0.50.$$

* * * * *

UNITED STATES PATENT AND TRADEMARK OFFICE
CERTIFICATE OF CORRECTION

PATENT NO. : 8,717,688 B2  
APPLICATION NO. : 13/732937  
DATED : May 6, 2014  
INVENTOR(S) : Ming-Ta Chou Page 1 of 1

It is certified that error appears in the above-identified patent and that said Letters Patent is hereby corrected as shown below:

In the Claims

Column 31, Claim 1, Lines 65 to 67, the left-hand formula should appear as follows:
$-3.5 < (R3+R4) / (R3-R4) < -0.2$; and
$-3.5 < (R5+R6) / (R5-R6) < -0.3$.

Column 33, Claim 10, Lines 28 to 30, the left-hand formula should appear as follows:
$-3.5 < (R3+R4) / (R3-R4) < -0.2$; and
$-3.5 < (R5+R6) / (R5-R6) < -0.3$.

Column 32, Claim 5, Line 40, the right-hand formula should appear as follows:
$-3.5 < (R3+R4) / (R3-R4) < -0.5$.

Column 32, Claim 6, Line 48, the right-hand formula should appear as follows:
$-3.5 < (R5+R6) / (R5-R6) < -0.6$.

Column 33, Claim 11, Line 40, the left-hand formula should appear as follows:
$-3.5 < (R3+R4) / (R3-R4) < -0.5$.

Column 33, Claim 12, Line 47, the left-hand formula should appear as follows:
$-3.5 < (R3+R4) / (R3-R4) < -1.0$.

Column 34, Claim 16, Lines 27 to 29, the right-hand formula should appear as follows:
$-3.5 < (R3+R4) / (R3-R4) < 0.6$; and
$-3.5 < (R5+R6) / (R5-R6) < -0.6$.

Signed and Sealed this
Sixth Day of January, 2015

Michelle K. Lee
*Deputy Director of the United States Patent and Trademark Office*